(12) United States Patent
Yoo

(10) Patent No.: US 8,654,450 B2
(45) Date of Patent: Feb. 18, 2014

(54) ZOOMS LENS SYSTEM AND PHOTOGRAPHING APPARATUS INCLUDING THE SAME

(75) Inventor: Ji-yeong Yoo, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 92 days.

(21) Appl. No.: 13/345,065

(22) Filed: Jan. 6, 2012

(65) Prior Publication Data

US 2012/0176686 A1 Jul. 12, 2012

(30) Foreign Application Priority Data

Jan. 6, 2011 (KR) .......................... 10-2011-001549

(51) Int. Cl.
*G02B 15/14* (2006.01)
*G02B 17/00* (2006.01)
*G02B 15/173* (2006.01)

(52) U.S. Cl.
CPC .................................. *G02B 15/173* (2013.01)
USPC ............................ 359/687; 359/678; 359/726

(58) Field of Classification Search
USPC ......................................... 359/678, 687, 726
See application file for complete search history.

(56) References Cited

U.S. PATENT DOCUMENTS

| 7,375,901 | B2 | 5/2008 | Tanaka | |
|---|---|---|---|---|
| 2006/0056048 | A1* | 3/2006 | Sato et al. | 359/684 |
| 2006/0056052 | A1* | 3/2006 | Matsui | 359/687 |
| 2006/0067662 | A1* | 3/2006 | Satori | 396/72 |
| 2007/0115560 | A1* | 5/2007 | Kushida et al. | 359/687 |
| 2010/0128361 | A1* | 5/2010 | Shirota | 359/684 |

FOREIGN PATENT DOCUMENTS

| JP | 2003-202500 A | 7/2003 |
|---|---|---|
| JP | 2007-323054 A | 12/2007 |
| KR | 1999-022810 A | 3/1999 |
| KR | 10-2009-0068820 A | 6/2009 |
| KR | 10-2010-0010378 A | 2/2010 |

\* cited by examiner

*Primary Examiner* — William Choi
(74) *Attorney, Agent, or Firm* — Sughrue Mion, PLLC

(57) ABSTRACT

A zoom lens system and a photographing apparatus including the same, wherein the zoom lens system includes a first lens group including one or more lenses, and an optical member for changing a path of light, and having a positive refractive power; a second lens group having a negative refractive power, a third lens group having a positive refractive power, and a fourth lens group having a positive refractive power, wherein zooming is performed by varying air gaps between the first through fourth lens groups.

18 Claims, 33 Drawing Sheets

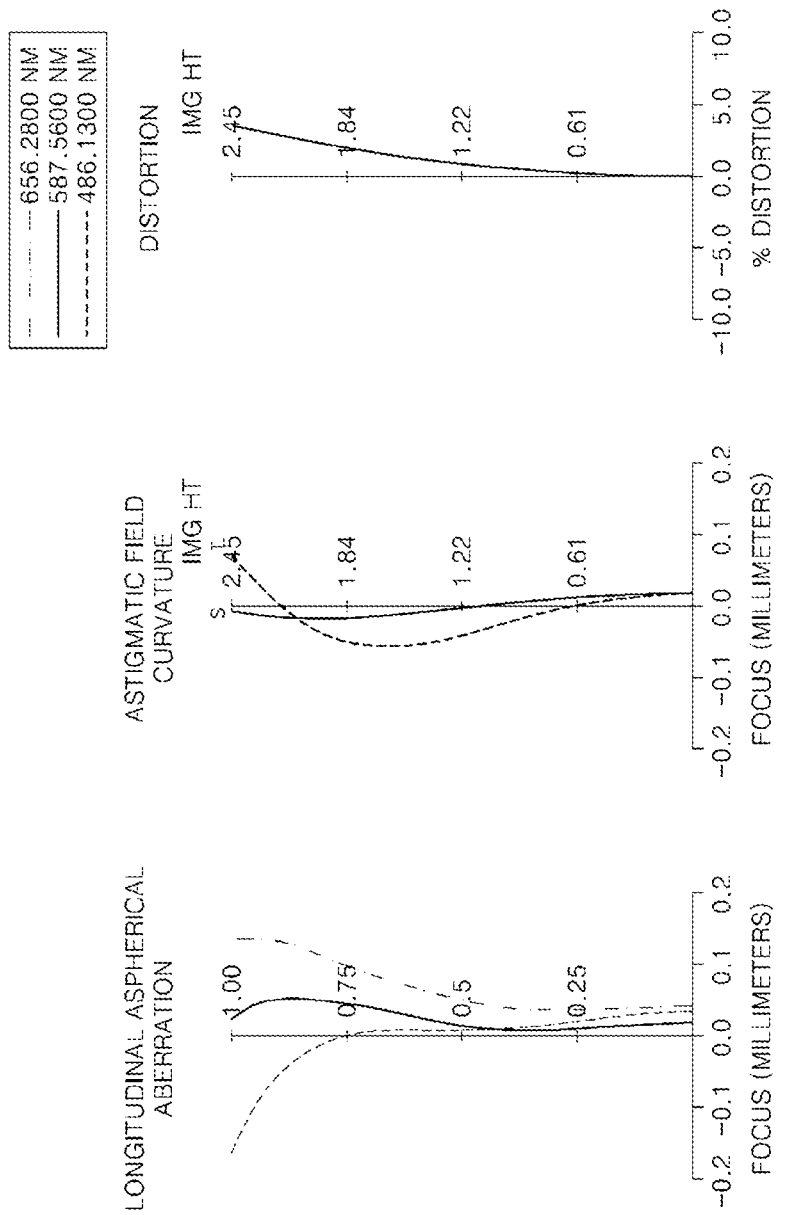

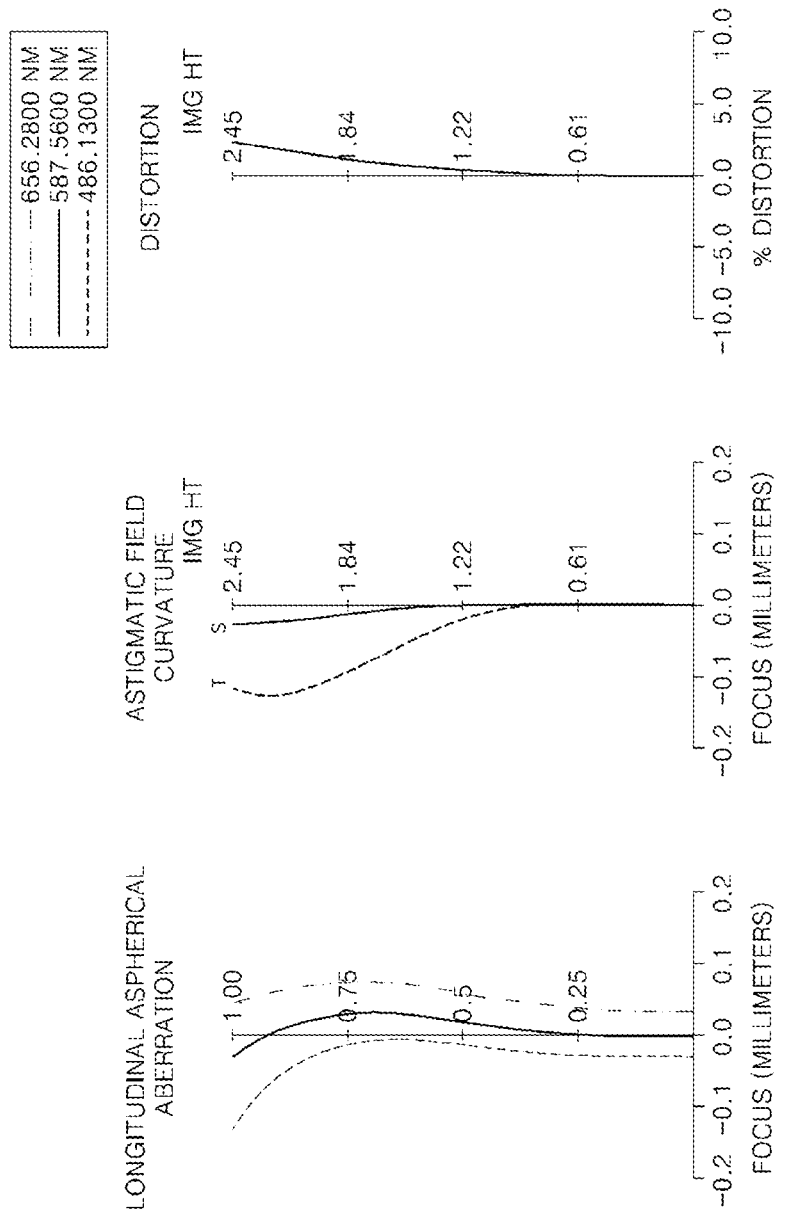

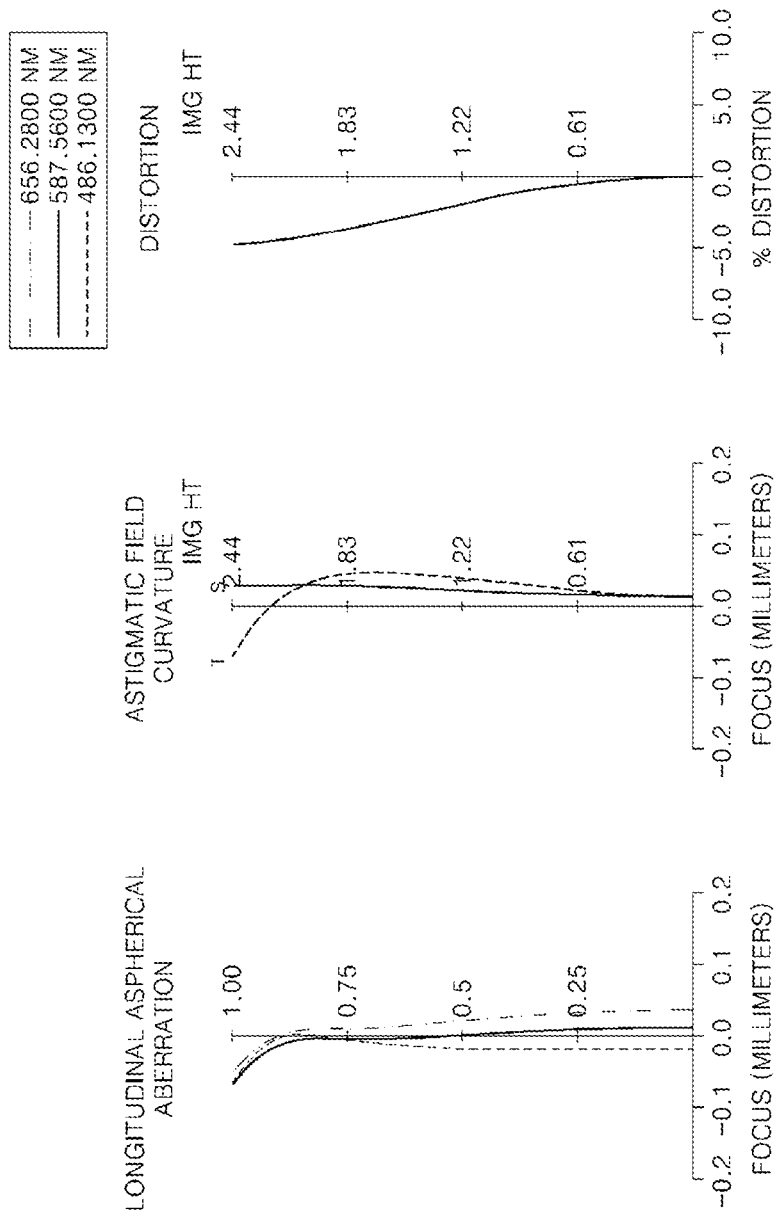

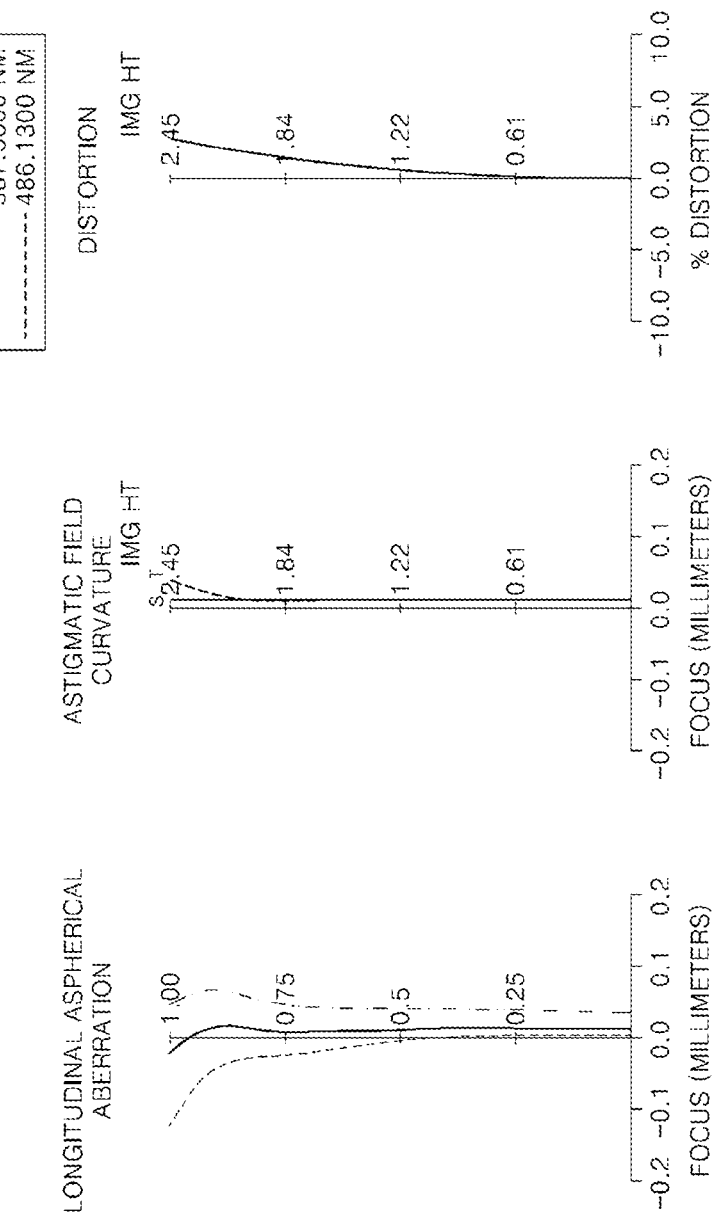

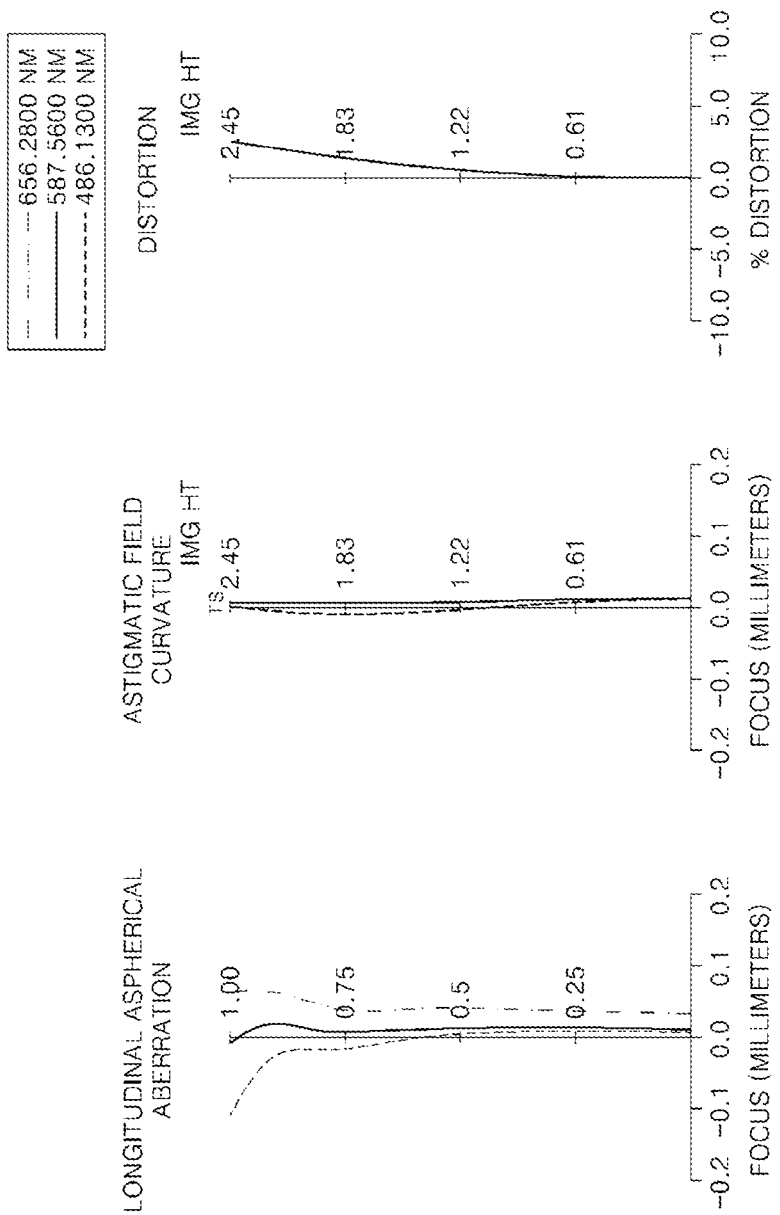

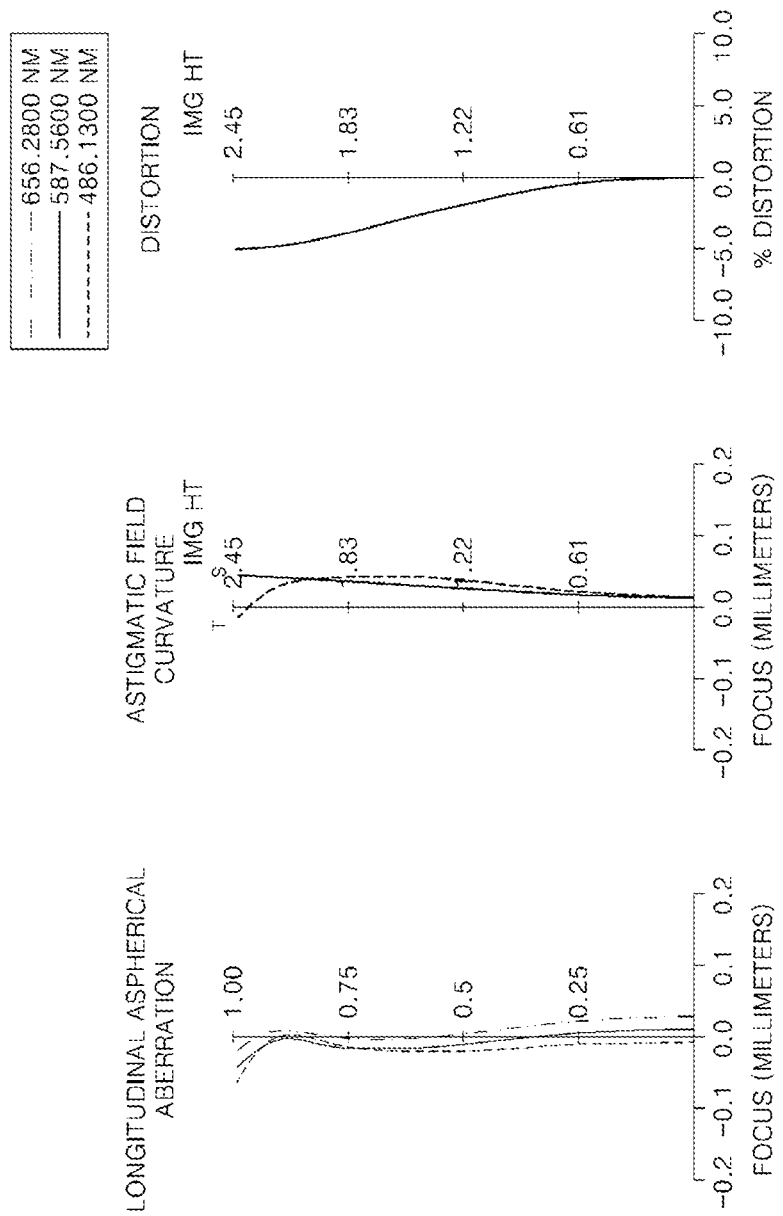

ZOOMS LENS SYSTEM AND PHOTOGRAPHING APPARATUS INCLUDING THE SAME

CROSS-REFERENCE TO RELATED PATENT APPLICATION

This application claims priority from Korean Patent Application No. 10-2011-0001549 filed on Jan. 6, 2011 in the Korean Intellectual Property Office, the disclosure of which is incorporated herein in its entirety by reference.

BACKGROUND

1. Field

Apparatuses consistent with exemplary embodiments relate to a zoom lens system and a photographing apparatus including the same.

2. Description of the Related Art

Recently, a zoom lens system used in photographing apparatuses such as digital cameras or digital camcorders having a charge coupled device (CCD) or a complementary metal-oxide semiconductor (CMOS) needs to be small-sized and to have a high optical performance. However, it is difficult to simultaneously achieve a high performance and compactness, and if a high-refraction aspherical material is used for the compactness, manufacturing costs increase. Thus, it is difficult to simultaneously obtain a high optical performance and low manufacturing costs.

A photographing apparatus is classified as a retractable type or an inner-zoom type. With respect to the retractable type, a lens is outwardly projected from a camera when photographing is performed, and the lens is retracted into a camera body when the camera is not used. In this regard, since a lens group is projected from the camera and is externally exposed, a shock resistance function and a water-proof function of the camera may deteriorate. With respect to the inner-zoom type, an optical path is curved by using a reflective member so as to protect a photographing apparatus from an external environment. In a case of a lens system including a prism for reflection and/or refraction, the thickness of the lens system may be decreased by curving an optical path by 90°. In order to achieve compactness with a reflection member and/or a refraction member in which the thickness of a lens system is decreased by using a reflective member and/or a refractive member including a prism, a reflective mirror, or the like, various methods such as a method of limiting an overall length of the lens system, a method of restricting sensitivity, or the like have been presented.

SUMMARY

One or more exemplary embodiments provide a small zoom lens system.

One or more exemplary embodiments also provide a photographing apparatus including a small zoom lens system.

According to an aspect of an exemplary embodiment, there is provided a zoom lens system including a first lens group including one or more lenses, and an optical member for changing a path of light, and having a positive refractive power; a second lens group having a negative refractive power; a third lens group having a positive refractive power; and a fourth lens group having a positive refractive power, wherein the first lens group, the second lens group, the third lens group, and the fourth lens group are sequentially arranged from an object side to an image side, wherein zooming is performed by varying air gaps between the first through fourth lens groups, and wherein the zoom lens system satisfies the following expressions:

$$1.8 \le \frac{f_I}{\sqrt{f_W f_T}} \le 2.7,$$

and $$-1.0 \le \frac{f_{II}}{\sqrt{f_W f_T}} \le -0.7,$$

where $f_W$ indicates an overall focal length at a wide angle end, $f_T$ indicates an overall focal length at a telephoto end, $f_I$ indicates a focal length of the first lens group, and $f_{II}$ indicates a focal length of the second lens group.

The third lens group may include an aperture.

The aperture may be disposed at the object side of the third lens group.

The optical member may include a prism and may satisfy the following expression:

$$n_{I(P)} \ge 180,$$

where $n_{I(P)}$ indicates a refractive index of the optical member of the first lens group.

The first lens group may include a negative lens, the optical member for changing a path of light that has passed through the negative lens, and a positive lens.

The negative lens may be a meniscus lens having a convex surface toward the object side.

The fourth lens group may include a positive lens and a negative lens.

The fourth lens group may perform focusing.

The third lens group may include a positive lens, a positive lens, and a negative lens.

An F-number at the wide angle end may be equal to or less than 1.8.

The third lens group may include two or more lenses.

At least one of the first through fourth lens groups may include at least one aspherical lens.

At least one of the second through fourth lens groups may include at least one doublet lens.

The second lens group and the fourth lens group may move during zooming.

According to another aspect, there is provided a photographing apparatus including a zoom lens system; and an imaging sensor for converting an image formed by the zoom lens system into an electrical signal, wherein the zoom lens system includes a first lens group including one or more lenses, and an optical member for changing a path of light, and having a positive refractive power; a second lens group having a negative refractive power; a third lens group having a positive refractive power; and a fourth lens group having a positive refractive power, wherein the first lens group, the second lens group, the third lens group, and the fourth lens group are sequentially arranged from an object side to an image side, zooming is performed by varying air gaps between the first through fourth lens groups, and the zoom lens system satisfies the following expressions:

$$1.8 \le \frac{f_I}{\sqrt{f_W f_T}} \le 2.7,$$

and $$-1.0 \le \frac{f_{II}}{\sqrt{f_W f_T}} \le -0.7,$$

where $f_W$ indicates an overall focal length at a wide angle end, $f_T$ indicates an overall focal length at a telephoto end, $f_I$ indicates a focal length of the first lens group, and $f_{II}$ indicates a focal length of the second lens group.

BRIEF DESCRIPTION OF THE DRAWINGS

The above and other aspects will become more apparent by describing in detail exemplary embodiments with reference to the attached drawings, in which:

FIGS. 2A through 2C are graphs illustrating aberrations at the wide angle end, the middle end, and the telephoto end of the zoom lens system of FIG. 1, according to an exemplary embodiment;

FIGS. 4A through 4C are graphs illustrating aberrations at the wide angle end, the middle end, and the telephoto end of the zoom lens system of FIG. 3, according to an exemplary embodiment;

FIGS. 6A through 6C are graphs illustrating aberrations at the wide angle end, the middle end, and the telephoto end of the zoom lens system of FIG. 5, according to an exemplary embodiment;

FIGS. 8A through 8C are graphs illustrating aberrations at the wide angle end, the middle end, and the telephoto end of the zoom lens system of FIG. 7, according to an exemplary embodiment;

FIGS. 10A through 10C are graphs illustrating aberrations at the wide angle end, the middle end, and the telephoto end of the zoom lens system of FIG. 9, according to an exemplary embodiment;

DETAILED DESCRIPTION OF THE EXEMPLARY EMBODIMENTS

Figure 1:
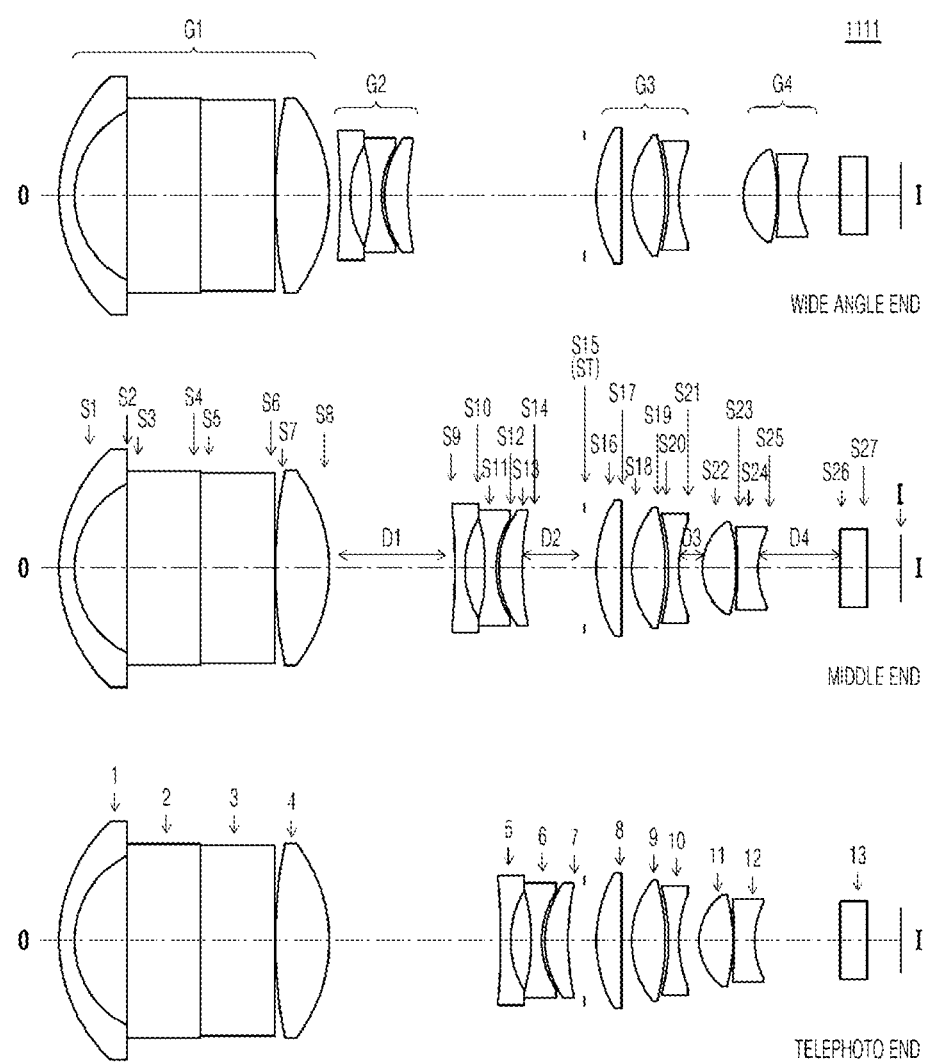
FIG. 1 illustrates a zoom lens system at each of a wide angle end, a middle end, and a telephoto end according to an exemplary embodiment.

Hereinafter, exemplary embodiments will be described in detail with reference to the attached drawings. In the drawings, like reference numerals in the drawings denote like elements, and the size of each component may be exaggerated for clarity.

Expressions such as "at least one of," when preceding a list of elements, modify the entire list of elements and do not modify the individual elements of the list.

FIG. 1 illustrates a zoom lens system 1111 at each of a wide angle end, a middle end, and a telephoto end according to an exemplary embodiment. The zoom lens system 1111 includes a first lens group G1, a second lens group G2, a third lens group G3, and a fourth lens group G4 that are sequentially arranged from an object side O to an image side I. The first lens group GI has a positive refractive power. The first lens group G1 may include a first lens 1, optical members 2 and 3 for changing an optical path of light passing through the first lens 1 and a second lens 4. The first lens 1 may be a negative lens, and the second lens 4 may also be a negative lens. The optical members 2 and 3 may include a reflective mirror, a prism, or an optical fiber. For example, the reflective mirror may bend an optical path by reflecting light by 90°. The optical members 2 and 3 allow a space to be efficiently used by bending incident light by a predetermined degree such as 90° with respect to an optical axis, and thus a photographing apparatus including the zoom lens system 1111 may be small-sized.

The first lens 1 may be a meniscus lens having a convex surface toward the object side O. The second lens 4 may be a double-convex lens.

The second lens group G2 has a negative refractive power. For example; the second lens group G2 may include a third lens 5, a fourth lens 6, and a fifth lens 7. The third lens 5 and the fourth lens 6 may be double-concave lenses. The fifth lens 7 may be a meniscus lens having a convex surface toward the object side O.

The third lens group G3 has a positive refractive power. The third lens group G3 may include two lenses or three lenses. For example, the third lens group G3 may include a sixth lens 8, a seventh lens 9 and an eighth lens 10. The sixth lens 8 may be a double-convex lens, the seventh lens 9 may also be a double-convex lens, and the eighth lens 10 may be a double-concave lens. Also, the sixth lens 8 may be a positive lens, the seventh lens 9 may be a positive lens, and the eighth lens 10 may be a negative lens. The third lens group G3 may include an aperture ST. For example, the aperture ST may be disposed at the object side O of the sixth lens 8.

Figure 3:
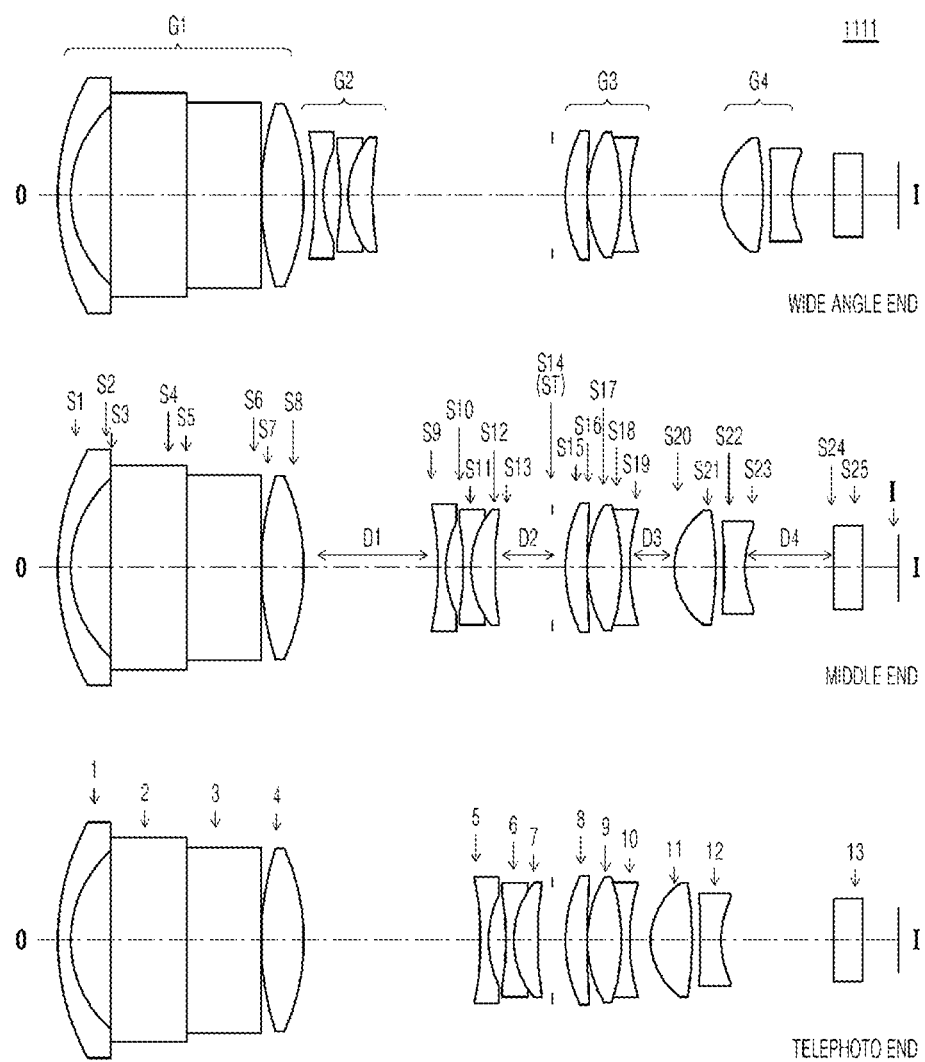
FIG. 3 illustrates a zoom lens system at each of a wide angle end, a middle end, and a telephoto end according to another exemplary embodiment.
Figure 5:
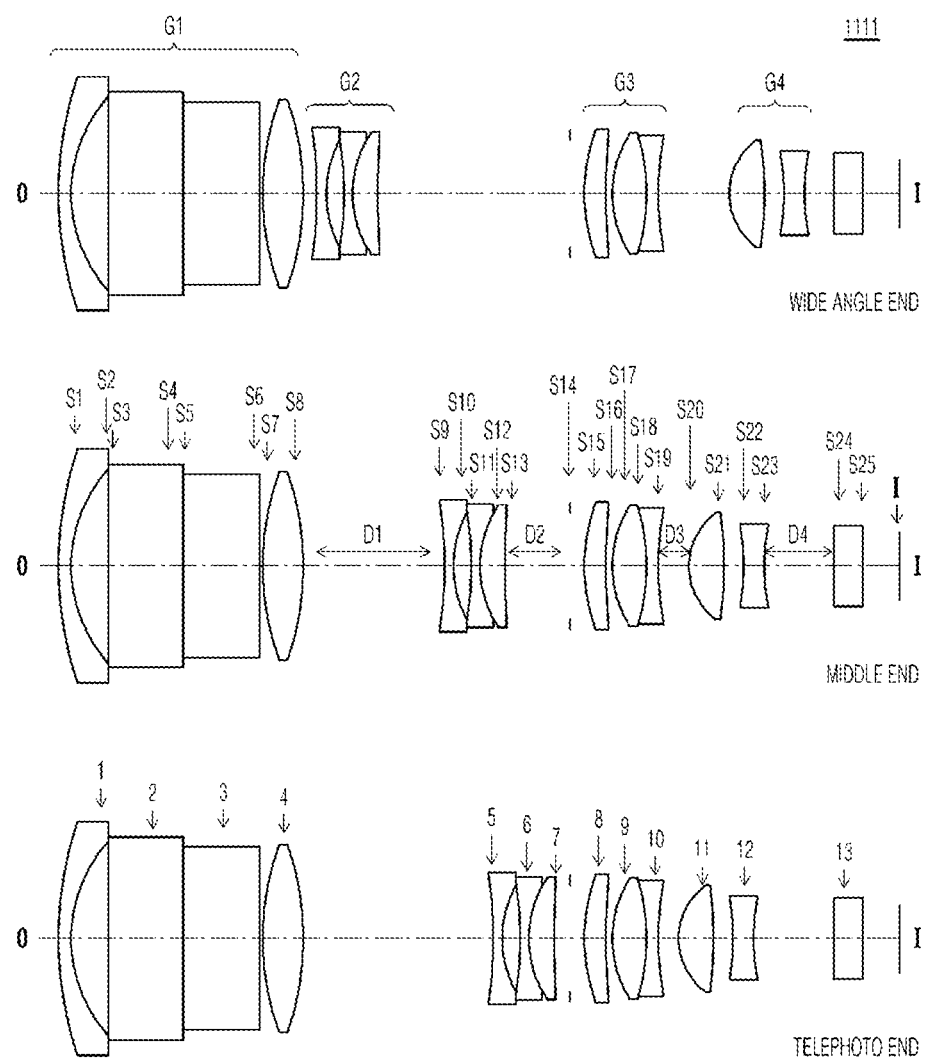
FIG. 5 illustrates a zoom lens system at each of a wide angle end, a middle end, and a telephoto end according to another exemplary embodiment.
Figure 7:
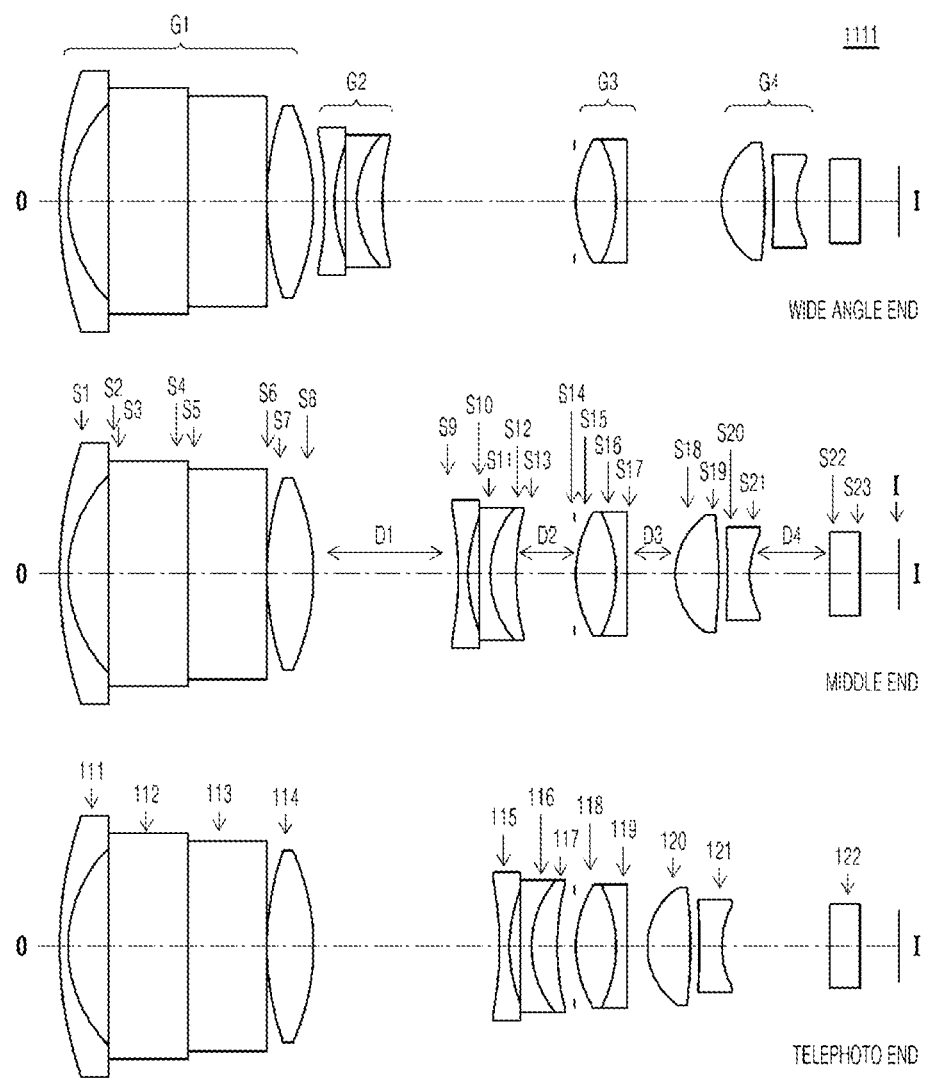
FIG. 7 illustrates a zoom lens system at each of a wide angle end, a middle end, and a telephoto end according to another exemplary embodiment.

FIGS. 1, 3, and 5 correspond to a case in which the third lens group G3 of the zoom lens system 1111 includes three lenses. FIGS. 7, 9, 11, 13, and 15 correspond to a case in which the third lens group G3 of the zoom lens system 1111 includes two lenses. Referring to FIG. 7, the first lens group G1 may include a first lens 111, optical members 112 and 113, and a second lens 114. The second lens group G2 may include a third lens 115, a fourth lens 116, and a fifth lens 117. The third lens group G3 may include a sixth lens 118 and a seventh lens 119. The fourth lens group G4 may include an eighth lens 120 and a ninth lens 121. A reference numeral 122 indicates an optical filter. The sixth lens 118 and the seventh lens 119 may be bonded.

Referring back to FIG. 1, the fourth lens group G4 has a positive refractive power. For example, the fourth lens group G4 may include a ninth lens 11 and a tenth lens 12. The ninth lens 11 may be a double-convex lens. The tenth lens 12 may be a double-concave lens. The ninth lens 11 may be a positive lens, and the tenth lens 12 may be a negative lens.

In the zoom lens system 1111 according to the present exemplary embodiment, the second lens group G2 and the fourth lens group G4 may move during zooming. Also, during zooming, the first lens group G1 and the third lens group G3 may not move. Thus, an overall length of the zoom lens system 1111 is not changed during zooming. Also, the fourth lens group G4 may perform focusing so as to complement movement of an image plane due to a variation in an object length. Since the fourth lens group G4 performs both zooming and focusing, the zoom lens system 1111 may be driven by using only two motors to move the lens groups, and thus, the zoom lens system 1111 may be small-sized.

During zooming from the wide angle end toward the telephoto end, the second lens group G2 moves toward the image side I so as to be distant from the first lens group G1. Also, during zooming, the fourth lens group G4 moves toward the object side O so as to be close to the third lens group G3.

At least one of the first through fourth lens groups G1, G2, G3 and G4 may include at least one aspherical lens. Also, at least one of the second through fourth lens groups G2, G3 and G4 may include at least one doublet lens. In order to configure a bright lens system, an F-number of the zoom lens system 1111 at the wide angle end may be equal to or less than 1.8.

In the present exemplary embodiment, the fourth lens group G4 may satisfy Expression 1 and Expression 2 below:

$$1.8 \leq \frac{f_I}{\sqrt{f_W f_T}} \leq 2.7, \qquad \langle \text{Expression 1} \rangle$$

and $$-1.0 \leq \frac{f_{II}}{\sqrt{f_W f_T}} \leq -0.7, \qquad \langle \text{Expression 2} \rangle$$

where $f_W$ indicates an overall focal length at the wide angle end, $f_T$ indicates an overall focal length at the telephoto end, $f_I$ indicates a focal length of the first lens group G1, and $f_{II}$ indicates a focal length of the second lens group G2.

Expression 1 defines a ratio of the focal length of the first lens group G1 with respect to the overall focal length at the wide angle end and the overall focal length at the telephoto end. If the ratio exceeds an upper limit value, the refractive power of the first lens group G1 decreases, and thus, an amount of movement of the second lens group G2 during zooming increases. By doing so, it may be difficult to make the zoom lens system 1111 small-sized. If the ratio exceeds a lower limit value, the positive refractive power of the first lens group G1 increases, and thus, coma correction may be difficult.

Expression 2 defines a ratio of the focal length of the second lens group G2 with respect to the overall focal length at the wide angle end and the overall focal length at the telephoto end, and in this regard, if a value of Expression 2 exceeds an upper limit value, the refractive power of the second lens group G2 increases and thus a focus position with respect to an error of a position with respect to zooming sharply varies, and thus it is difficult to achieve a desired performance. If the value of Expression 2 exceeds a lower limit value, an amount of movement of the second lens group G2 during zooming increases and thus it may be difficult to make the zoom lens system 1111 small-sized.

The optical member may satisfy Expression 3 below:

$$n_{i(P)} \geq 1.80 \qquad \langle \text{Expression 3} \rangle,$$

where $n_{i(p)}$ indicates a refractive index at a d-line of the optical member of the first lens group G1.

In the present exemplary embodiment, an aspherical surface is defined below.

An aspherical shape of a zoom lens according to the present exemplary embodiment may be defined by Equation 4 below, when an X-axis indicates an optical axis direction, a Y-axis indicates a direction perpendicular to the optical axis direction, and a forward direction of light is a positive direction. Here, x indicates a distance from a vertex of a lens in the optical axis direction, y indicates a distance in a direction perpendicular to the optical axis, k is a conic constant, A, B, C and D are aspherical coefficients, and c is a reciprocal number (1/R) of a curvature radius at the vertex of the lens.

$$x = \frac{cy^2}{1 + \sqrt{1 - (K+1)c^2 y^2}} + Ay^4 + By^6 + Cy^8 + Dy^{10} \qquad \langle \text{Expression 4} \rangle$$

Design data of the zoom lens system 1111 according to the present exemplary embodiment will now be described.

Hereinafter, EFL indicates a focal length in mm, Fno indicates an F-number, 2ω indicates a viewing angle in degrees, and D1, D2, D3 and D4 indicate variable lengths in mm. Also, R indicates a curvature radius in mm, Dn indicates a center thickness of a lens or a distance in mm between lenses, Nd indicates a refractive index of a material, Vd indicates an Abbe's number of a material, and ASP indicates an aspherical surface.

<First Exemplary Embodiment>

Table 1 shows design data of the zoom lens system 1111 of FIG. 1. With respect to Table 1, an optical filter 13 such as an infrared-light blocking filter may be further disposed between the tenth lens 12 and an image sensor I, and S26 and S27 indicate two surfaces of the optical filter 13. Hereinafter, the image sensor I and the image side I will be described using the same reference numeral.

TABLE 1

| Lens surface | R | Dn | Nd | Vd |
|---|---|---|---|---|
| S1 | 12.6732 | 1.000 | 1.9227 | 20.8804 |
| S2 | 7.1760 | 4.0736 | | |
| S3 | infinity | 5.5000 | 1.8467 | 23.7848 |
| S4 | infinity | 0.000 | | |
| S5 | infinity | 5.5000 | 1.8467 | 23.7848 |
| S6 | infinity | 0.1000 | | |
| S7(ASP) | 30.8083 | 3.8777 | 1.6097 | 57.7355 |
| S8(ASP) | −11.6415 | D1 | | |
| S9 | −68.7616 | 0.8000 | 1.8160 | 46.5719 |
| S10 | 8.5179 | 1.4489 | | |
| S11 | −14.8099 | 0.8000 | 1.4875 | 70.4412 |
| S12 | 6.7644 | 0.2572 | | |
| S13 | 7.6112 | 1.6716 | 1.8467 | 23.7848 |
| S14 | 20.9597 | D2 | | |
| S15(ST) | infinity | 1.000 | | |
| S16 | 11.3819 | 1.8858 | 1.8335 | 29.9705 |
| S17 | 1052.1485 | 0.7741 | | |
| S18 | 7.7982 | 2.5 | 1.4875 | 70.4412 |
| S19 | −16.0503 | 0.1628 | | |
| S20 | −14.7963 | 0.8000 | 1.8467 | 23.7848 |
| S21 | 9.2144 | D3 | | |
| S22 | 4.2424 | 2.5000 | 1.4875 | 70.4412 |
| S23 | −14.6403 | 0.1000 | | |

TABLE 1-continued

| Lens surface | R | Dn | Nd | Vd |
|---|---|---|---|---|
| S24(ASP) | −87.5227 | 1.5000 | 1.8086 | 40.4212 |
| S25(ASP) | 11.0513 | D4 | | |
| S26 | infinity | 2.1200 | 1.5168 | 64.1983 |
| S27 | infinity | 2.5340 | | |
| S28 | IMG | | | |

Table 2 shows aspherical coefficients of the zoom lens system 1111 of FIG. 1, and Table 3 shows a focal length (EFL), an F-number (Fno), an entire viewing angle (2ω), and variable lengths (D1, D2, D3 and D4) at each of the wide angle end, the middle end, and the telephoto end.

TABLE 2

| | K | A | B | C |
|---|---|---|---|---|
| S7 | −4.7407 | −3.6178e−005 | 6.6115e−007 | −2.6382e−008 |
| S8 | −0.2933 | −3.1789e−006 | 7.9968e−007 | −2.8667e−008 |
| S24 | 10.0000 | −9.1322e−004 | 5.1745e−005 | −1.5958e−006 |
| S25 | −1.4980 | 1.9915e−003 | 1.9889e−004 | 5.9864e−006 |

TABLE 3

| Variable length | Wide angle end | Middle end | Telephoto end |
|---|---|---|---|
| EFL | 3.8000 | 11.4000 | 19.000 |
| Fno | 1.7866 | 2.4309 | 2.4838 |
| 2ω | 68.2202 | 23.5490 | 14.2100 |
| D1 | 0.9000 | 9.4698 | 12.9000 |
| D2 | 13.1500 | 4.5802 | 1.1500 |
| D3 | 4.8626 | 1.7600 | 1.5000 |
| D4 | 3.0440 | 6.1466 | 6.4066 |

Figure 2A:
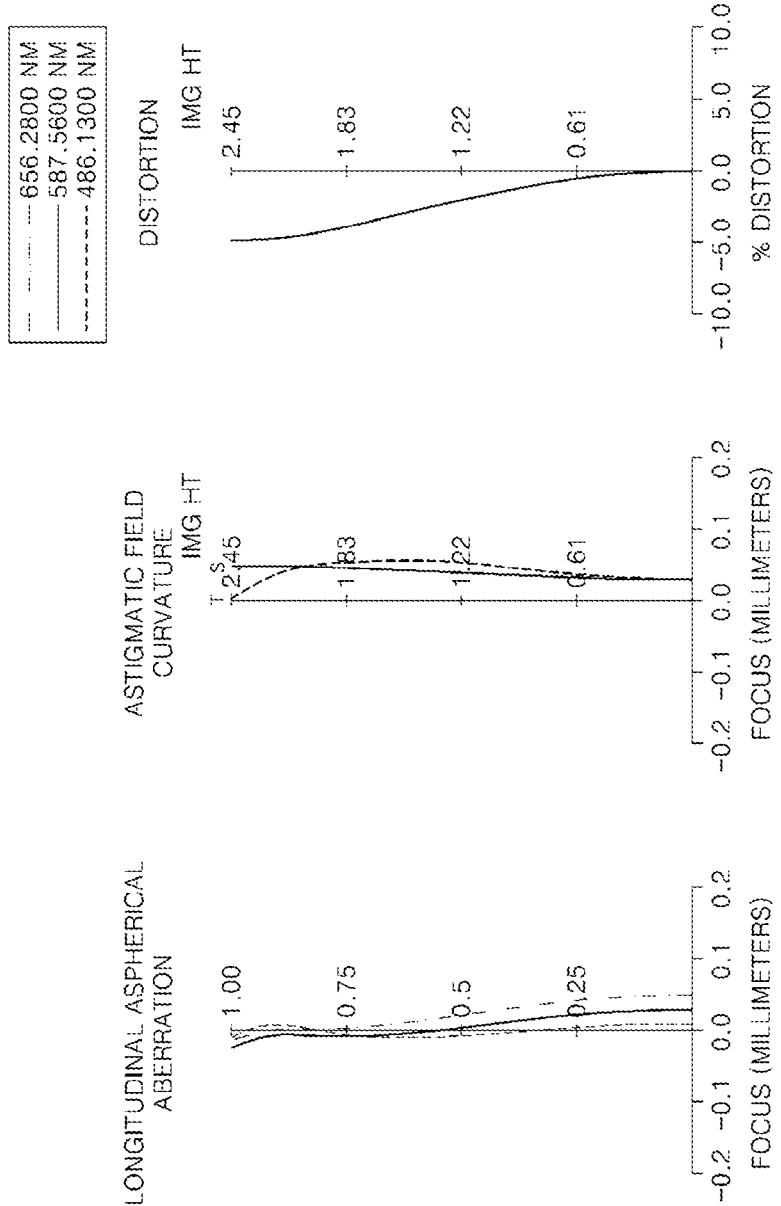
Figure 2B:
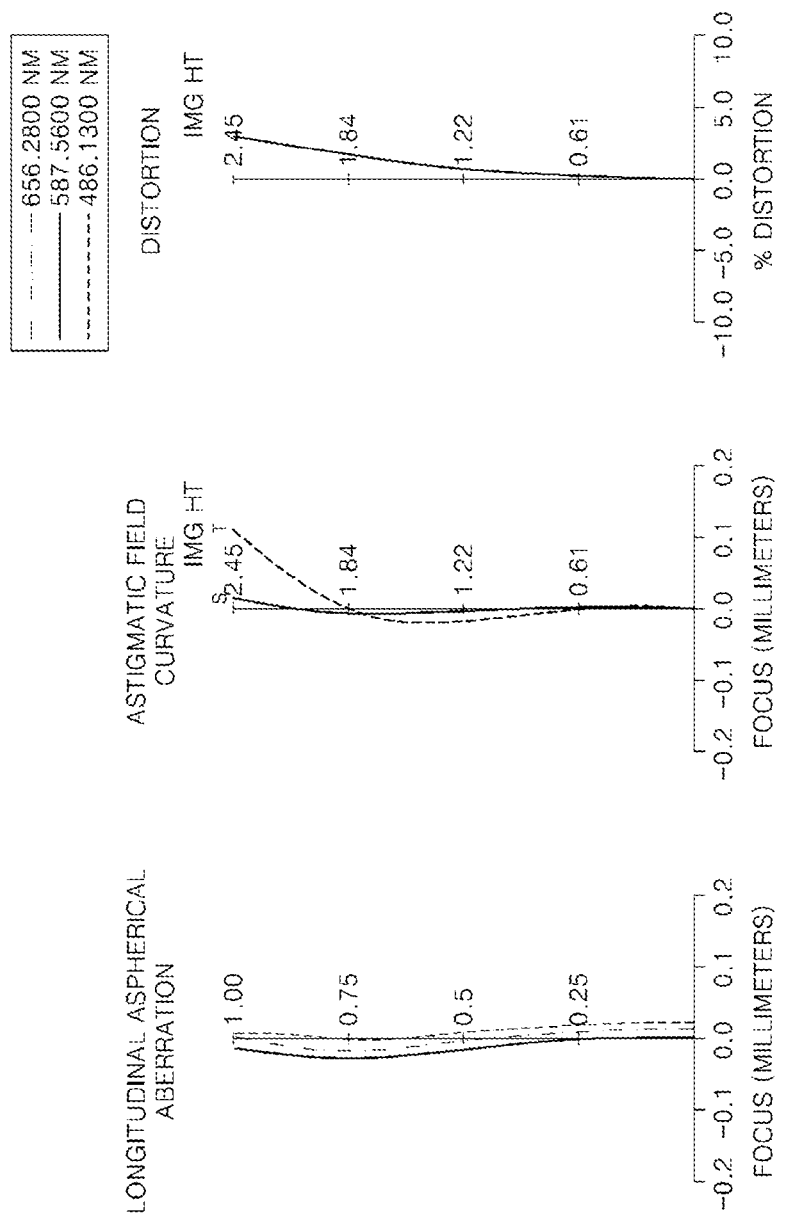

FIGS. 2A through 2C are graphs illustrating aberrations at the wide angle end, the middle end, and the telephoto end of the zoom lens system 1111 of FIG. 1. Also, a tangential field curvature and a sagittal field curvature are shown as an astigmatic field curvature.

<Second Exemplary Embodiment>

TABLE 4

| Lens surface | R | Dn | Nd | Vd |
|---|---|---|---|---|
| S1 | 18.8089 | 0.8500 | 1.9229 | 20.8804 |
| S2 | 8.9328 | 2.9262 | | |
| S3 | Infinity | 5.5000 | 1.8052 | 25.4652 |
| S4 | Infinity | 0.0000 | | |
| S5 | Infinity | 5.5000 | 1.8052 | 25.4652 |
| S6 | Infinity | 0.1000 | | |
| S7(ASP) | 23.9974 | 2.9663 | 1.6900 | 53.0000 |
| S8(ASP) | −16.9212 | D1 | | |
| S9 | −21.3869 | 0.6000 | 1.6204 | 60.3438 |
| S10 | 7.9422 | 1.1620 | | |
| S11 | −40.9052 | 0.6000 | 1.6204 | 60.3438 |
| S12 | 6.2125 | 1.7899 | 1.8052 | 25.4564 |
| S13 | 21.9691 | D2 | | |
| S14(ST) | Infinity | 1.0000 | | |
| S15 | 11.6242 | 1.6156 | 1.8052 | 25.4564 |
| S16 | 73.6349 | 0.1000 | | |
| S17 | 10.0523 | 2.3866 | 1.4875 | 70.4412 |
| S18 | −14.9903 | 0.6000 | 1.8052 | 25.4564 |
| S19 | 12.8026 | D3 | | |
| S20 | 4.9270 | 3.0000 | 1.5891 | 61.2526 |
| S21 | −31.2567 | 0.7200 | | |
| S22(ASP) | −90.9231 | 1.5000 | 1.8170 | 24.2000 |
| S23(ASP) | 11.7861 | D4 | | |

TABLE 4-continued

| Lens surface | R | Dn | Nd | Vd |
|---|---|---|---|---|
| S24 | infinity | 2.1200 | 1.5168 | 64.1983 |
| S25 | infinity | 2.6926 | | |
| S26 | IMG | | | |

Table 5 shows aspherical coefficients of the zoom lens system 1111 of FIG. 3, and Table 6 shows a focal length (EFL), an F-number (Fno), an entire viewing angle (2ω), and variable lengths (D1, D2, D3 and D4) at each of the wide angle end, the middle end, and the telephoto end of the zoom lens system 1111 of FIG. 3.

TABLE 5

| | K | A | B | C |
|---|---|---|---|---|
| S7 | −7.2927 | −3.1055e−005 | −3.9051e−006 | 1.2136e−007 |
| S8 | 0.2562 | −6.7689e−005 | 4.2881e−006 | −1.2398e−007 |
| S22 | −10.0000 | −0.0019 | 8.3980e−005 | −3.5975e−006 |
| S23 | −6.5954 | 0.0009 | 0.0002 | −4.6824e−006 |

TABLE 6

| Variable length | Wide angle end | Middle end | Telephoto end |
|---|---|---|---|
| EFL | 3.8000 | 11.3999 | 18.9998 |
| Fno | 1.7884 | 2.4501 | 2.7720 |
| 2ω | 68.3388 | 34.6680 | 14.3364 |
| D1 | 0.9000 | 9.9089 | 12.9000 |
| D2 | 13.1000 | 4.0911 | 1.1000 |
| D3 | 6.6233 | 3.1696 | 1.5000 |
| D4 | 3.0320 | 6.4857 | 8.1553 |

Figure 4A:
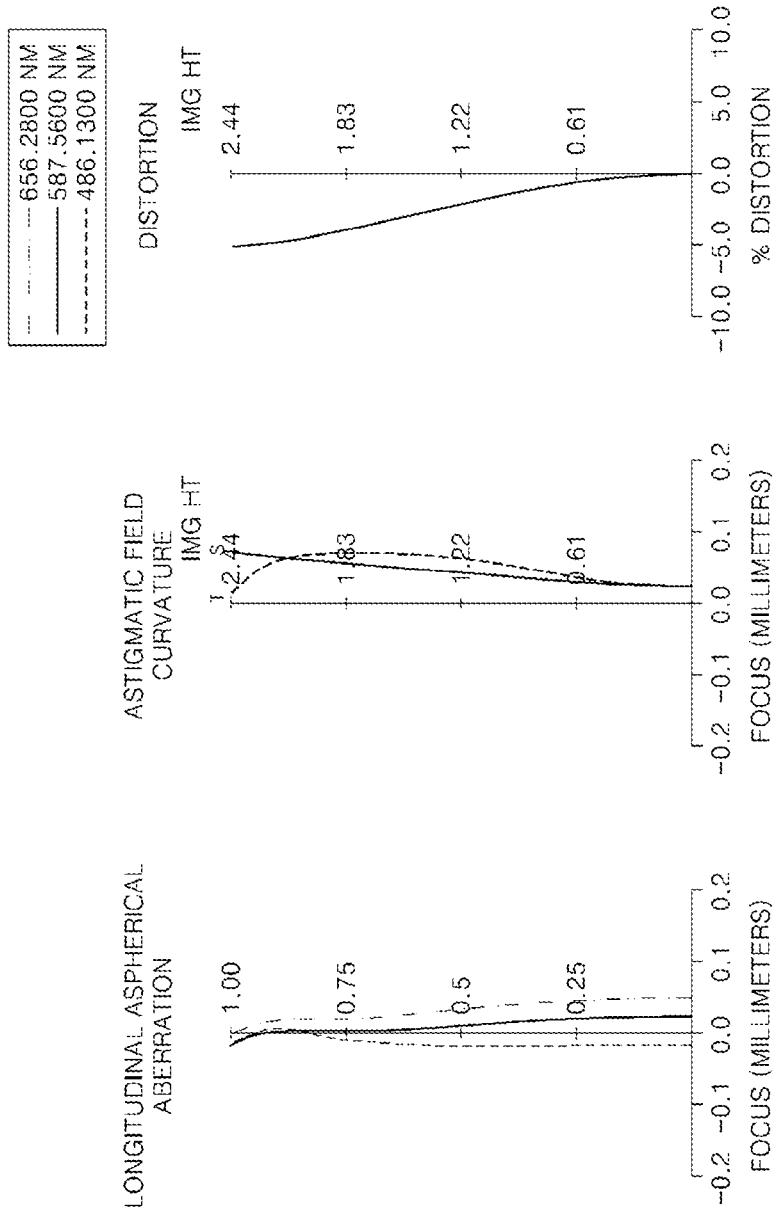
Figure 4B:
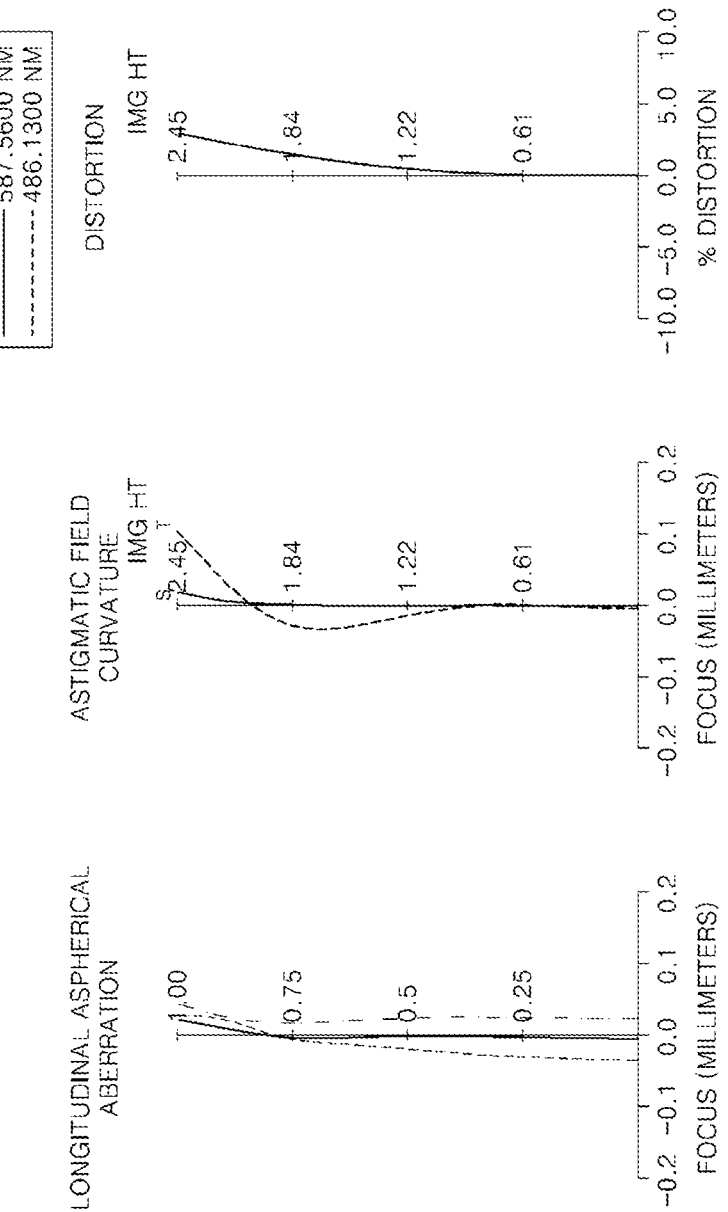

FIGS. 4A through 4C are graphs illustrating aberrations at the wide angle end, the middle end, and the telephoto end of the zoom lens system 1111 of FIG. 3.

<Third Exemplary Embodiment>

FIG. 5 is a diagram of the zoom lens system 1111 at each of a wide angle end, a middle end, and a telephoto end according to another exemplary embodiment. Table 7 shows design data of the zoom lens system 1111 of FIG. 5.

TABLE 7

| Lens surface | R | Dn | Nd | Vd |
|---|---|---|---|---|
| S1 | 27.2366 | 0.8500 | 1.9229 | 20.8804 |
| S2 | 10.6429 | 2.7232 | | |
| S3 | Infinity | 5.5000 | 1.8467 | 23.7848 |
| S4 | Infinity | 0.0000 | | |
| S5 | Infinity | 5.5000 | 1.8467 | 23.7848 |
| S6 | Infinity | 0.2095 | | |
| S7(ASP) | 19.3345 | 3.0048 | 1.6900 | 53.0000 |
| S8 | −19.6619 | D1 | | |
| S9 | −37.0269 | 0.6500 | 1.8830 | 40.8054 |
| S10 | 8.7365 | 1.3368 | | |
| S11 | −23.8758 | 0.6500 | 1.6178 | 63.3959 |
| S12 | 8.4024 | 1.7899 | 1.9229 | 20.8804 |
| S13 | 50.7436 | D2 | | |
| S14(ST) | Infinity | 1.0000 | | |
| S15 | 12.6607 | 1.6085 | 1.9229 | 20.8804 |
| S16 | 40.5916 | 0.5131 | | |
| S17 | 9.0557 | 2.5000 | 1.4875 | 70.4412 |
| S18 | −15.5636 | 0.8000 | 1.9229 | 20.8804 |
| S19 | 19.0645 | D3 | | |
| S20 | 4.9174 | 2.5000 | 1.5638 | 60.8301 |
| S21 | −34.1644 | 1.4522 | | |
| S22(ASP) | −24.7628 | 1.5000 | 1.8170 | 24.2000 |
| S23(ASP) | 17.4229 | D4 | | |
| S24 | infinity | 2.1200 | 1.5168 | 64.1983 |
| S25 | infinity | 2.6926 | | |
| S26 | IMG | | | |

Table 8 shows aspherical coefficients of the zoom lens system 1111 of FIG. 5, and Table 9 shows a focal length (EFL), an F-number (Fno), an entire viewing angle (2ω), and variable lengths (D1, D2, D3 and D4) at each of the wide angle end, the middle end, and the telephoto end of the zoom lens system 1111 of FIG. 5.

TABLE 8

|  | K | A | B | C |
|---|---|---|---|---|
| S7 | 0.4910 | −4.7146e−005 | −8.1253e−008 | −1.0108e−009 |
| S22 | −2.8114 | −0.0030 | 1.1815e−004 | −1.93658e−006 |
| S23 | −8.1184 | −2.8784e−004 | 2.2236e−004 | 5.1839e−006 |

TABLE 9

| Variable length | Wide angle end | Middle end | Telephoto end |
|---|---|---|---|
| EFL | 3.8000 | 11.4000 | 18.9996 |
| Fno | 1.8207 | 2.4136 | 2.5571 |
| 2ω | 68.1230 | 23.5578 | 14.3046 |
| D1 | 0.9000 | 10.1770 | 13.7143 |
| D2 | 13.9143 | 4.6373 | 1.1000 |
| D3 | 5.1628 | 2.2335 | 1.5000 |
| D4 | 2.1223 | 5.0516 | 5.7851 |

Figure 6B:
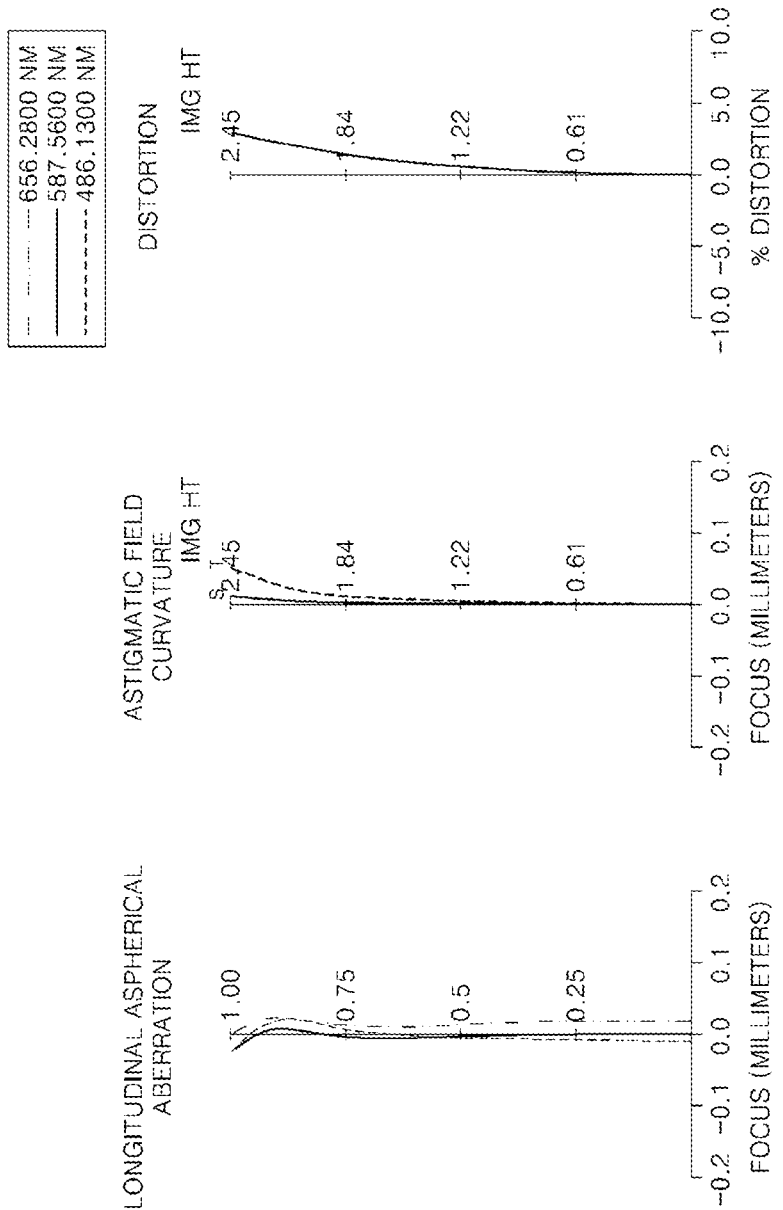

FIGS. 6A through 6C are graphs illustrating aberrations at the wide angle end, the middle end, and the telephoto end of the zoom lens system 1111 of FIG. 5.

<Fourth Exemplary Embodiment>

FIG. 7 is a diagram of the zoom lens system 1111 at each of a wide angle end, a middle end, and a telephoto end according to another exemplary embodiment.

Table 10 shows design data of the zoom lens system 1111 of FIG. 7.

TABLE 10

| Lens surface | R | Dn | Nd | Vd |
|---|---|---|---|---|
| S1 | 27.5841 | 0.6500 | 1.8467 | 23.7848 |
| S2 | 10.0983 | 2.8426 |  |  |
| S3 | Infinity | 5.5000 | 1.9229 | 20.8804 |
| S4 | Infinity | 0.0000 |  |  |
| S5 | Infinity | 5.5000 | 1.9229 | 20.8804 |
| S6 | Infinity | 0.1000 |  |  |
| S7(ASP) | 19.7344 | 3.1723 | 1.6226 | 58.1640 |
| S8 | −17.4831 | D1 |  |  |
| S9 | −26.2279 | 0.6500 | 1.6935 | 53.3430 |
| S10 | 10.8619 | 0.8365 |  |  |
| S11 | 758.7320 | 0.6500 | 1.7725 | 49.6243 |
| S12 | 6.4056 | 1.8527 | 1.9229 | 20.8804 |
| S13 | 16.8589 | D2 |  |  |
| S14(ST) | Infinity | 0.2000 |  |  |
| S15 | 8.8964 | 2.7535 | 1.6186 | 42.6334 |
| S16 | −8.8964 | 0.8000 | 1.8996 | 29.0446 |
| S17 | 508.0817 | D3 |  |  |
| S18 | 4.8151 | 3.0000 | 1.6180 | 63.3959 |
| S19 | −38.4588 | 0.6754 |  |  |
| S20(ASP) | 37.6970 | 1.5000 | 1.8170 | 24.2000 |
| S21(ASP) | 6.1952 | D4 |  |  |
| S22 | infinity | 2.1200 | 1.5168 | 64.1983 |
| S23 | infinity | 2.7417 |  |  |
| S24 | IMG |  |  |  |

Table 11 shows aspherical coefficients of the zoom lens system 1111 of FIG. 7, and Table 12 shows a focal length (EFL), an F-number (Fno), an entire viewing angle (2ω), and variable lengths (D1, D2, D3 and D4) at each of the wide angle end, the middle end, and the telephoto end of the zoom lens system 1111 of FIG. 7.

TABLE 11

|  | K | A | B | C |
|---|---|---|---|---|
| S7 | −1.0849 | −1.5366e−005 | −1.2527e−007 | −1.6078e−009 |
| S20 | −5.4806 | −2.9254e−003 | 2.7445e−005 | 1.7760e−006 |
| S21 | −0.3673 | −2.2405e−004 | 1.9243e−004 | 1.4277e−005 |

TABLE 12

| Variable length | Wide angle end | Middle end | Telephoto end |
|---|---|---|---|
| EFL | 3.8000 | 11.4000 | 19.000 |
| Fno | 1.8000 | 2.4863 | 2.8871 |
| 2ω | 68.3836 | 23.5586 | 14.3510 |
| D1 | 0.9000 | 10.2523 | 13.2783 |
| D2 | 13.4783 | 4.1260 | 1.1000 |
| D3 | 6.6469 | 3.3660 | 1.5000 |
| D4 | 2.4302 | 5.7111 | 7.5771 |

Figure 8A:
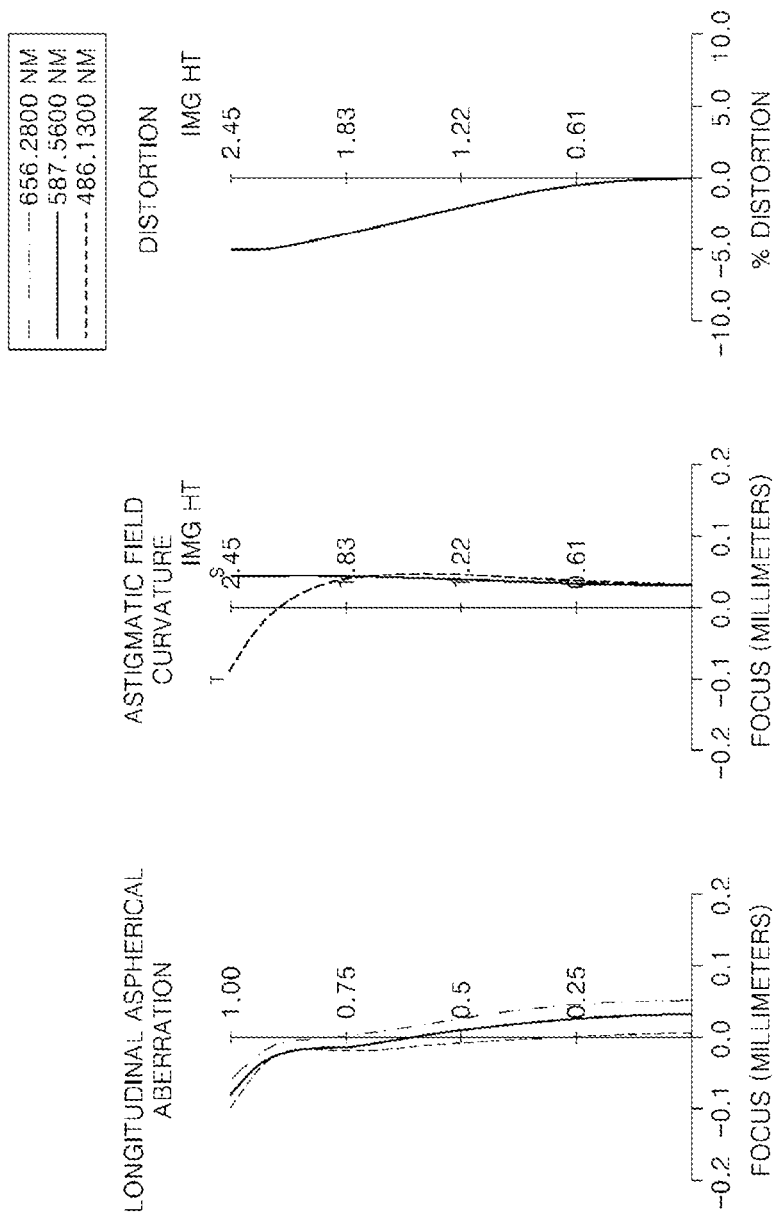
Figure 8B:
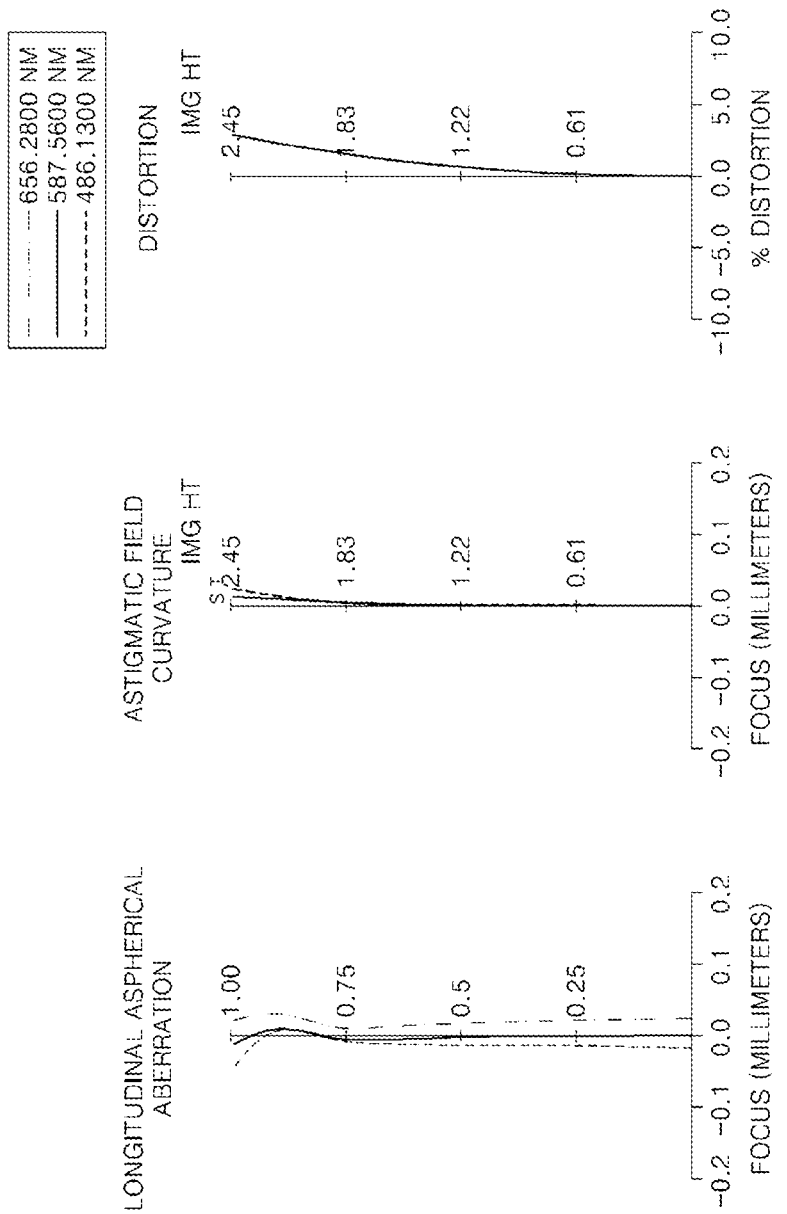

FIGS. 8A through 8C are graphs illustrating aberrations at the wide angle end, the middle end, and the telephoto end of the zoom lens system 1111 of FIG. 7.

<Fifth Exemplary Embodiment>

Figure 9:
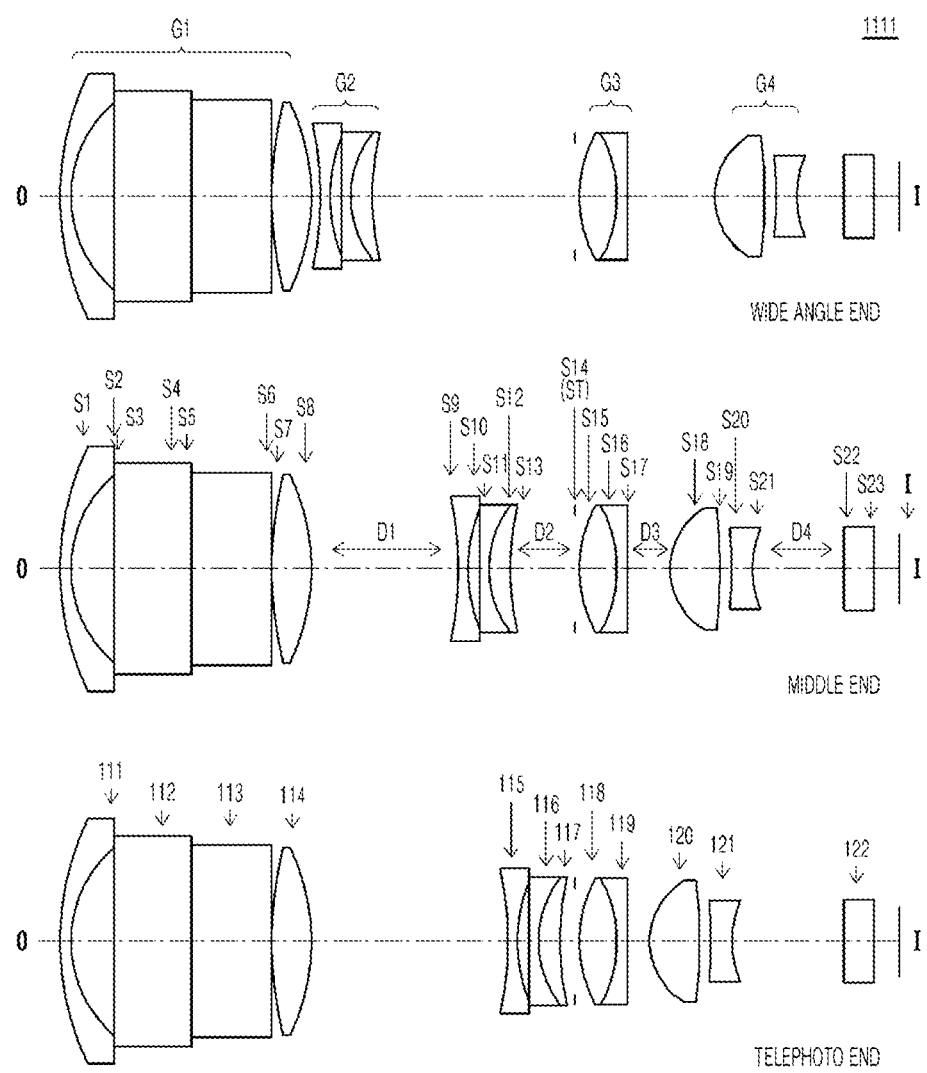
FIG. 9 illustrates a zoom lens system at each of a wide angle end, a middle end, and a telephoto end according to another exemplary embodiment.

FIG. 9 is a diagram of the zoom lens system 1111 at each of a wide angle end, a middle end, and a telephoto end according to another exemplary embodiment.

Table 13 shows design data of the zoom lens system 1111 of FIG. 9.

TABLE 13

| Lens surface | R | Dn | Nd | vd |
|---|---|---|---|---|
| S1 | 20.2159 | 0.6500 | 1.8052 | 25.4564 |
| S2 | 8.5749 | 3.1022 |  |  |
| S3 | Infinity | 5.5000 | 1.9229 | 20.8804 |
| S4 | Infinity | 0.0000 |  |  |
| S5 | Infinity | 5.5000 | 1.9229 | 20.8804 |
| S6 | Infinity | 0.1000 |  |  |
| S7(ASP) | 25.6673 | 2.8074 | 1.6226 | 58.1640 |
| S8 | −14.5433 | D1 |  |  |
| S9 | −20.9081 | 0.6500 | 1.7880 | 47.4938 |
| S10 | 11.6354 | 0.8023 |  |  |
| S11 | −1983.3472 | 0.6500 | 1.6180 | 63.3959 |
| S12 | 7.3982 | 1.5035 | 1.9229 | 20.8804 |
| S13 | 17.4359 | D2 |  |  |
| S14(ST) | Infinity | 0.3500 |  |  |
| S15 | 9.3194 | 2.6190 | 1.6237 | 47.0507 |
| S16 | −9.2643 | 0.8000 | 1.9037 | 31.3150 |
| S17 | 433.2150 | D3 |  |  |
| S18 | 4.8836 | 3.5000 | 1.6180 | 63.3959 |
| S19 | −46.7906 | 0.8102 |  |  |
| S20(ASP) | −66.5138 | 1.5000 | 1.8170 | 24.2000 |
| S21(ASP) | 8.4994 | D4 |  |  |
| S22 | infinity | 2.1200 | 1.5168 | 64.1983 |
| S23 | infinity | 1.7758 |  |  |
| S24 | IMG |  |  |  |

Table 14 shows aspherical coefficients of the zoom lens system 1111 of FIG. 9, and Table 15 shows a focal length (EFL), an F-number (Fno), an entire viewing angle (2ω), and variable lengths (D1, D2, D3 and D4) at each of the wide angle end, the middle end, and the telephoto end of the zoom lens system 1111 of FIG. 9.

TABLE 14

| | K | A | B | C | D |
|---|---|---|---|---|---|
| S7 | −1.0378 | −1.8769e−005 | −1.2055e−007 | 3.7602e−009 | −3.5628e−011 |
| S20 | 9.5920 | −2.7118e−003 | 2.9174e−005 | 7.6110e−006 | −5.7194e−007 |
| S21 | −0.8993 | 6.2694e−004 | 1.2819e−004 | 3.6054e−005 | −1.1367e−006 |

TABLE 15

| Variable length | Wide angle end | Middle end | Telephoto end |
|---|---|---|---|
| EFL | 3.8000 | 11.4000 | 19.000 |
| Fno | 1.8000 | 2.5337 | 2.8882 |
| 2ω | 68.3346 | 23.2890 | 14.2198 |
| D1 | 0.6500 | 10.3651 | 13.7897 |
| D2 | 14.2397 | 4.5246 | 1.1000 |
| D3 | 6.0605 | 2.9765 | 1.5000 |
| D4 | 3.3394 | 6.3933 | 7.8699 |

Figure 10B:
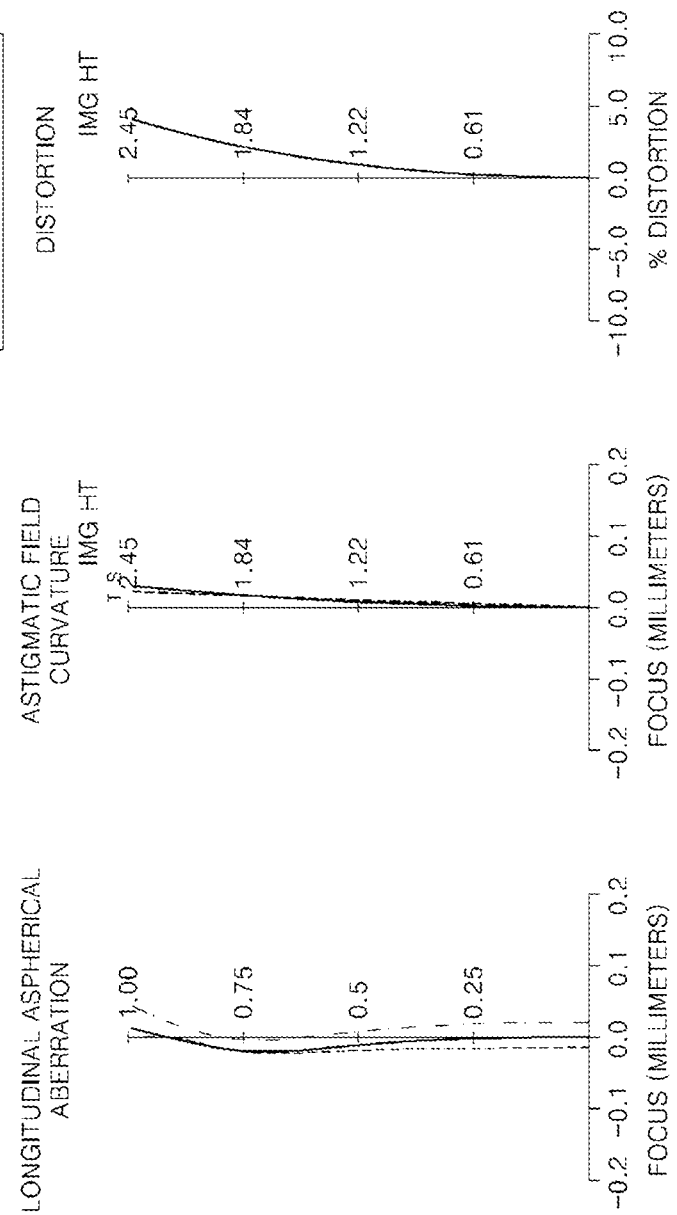
Figure 10C:
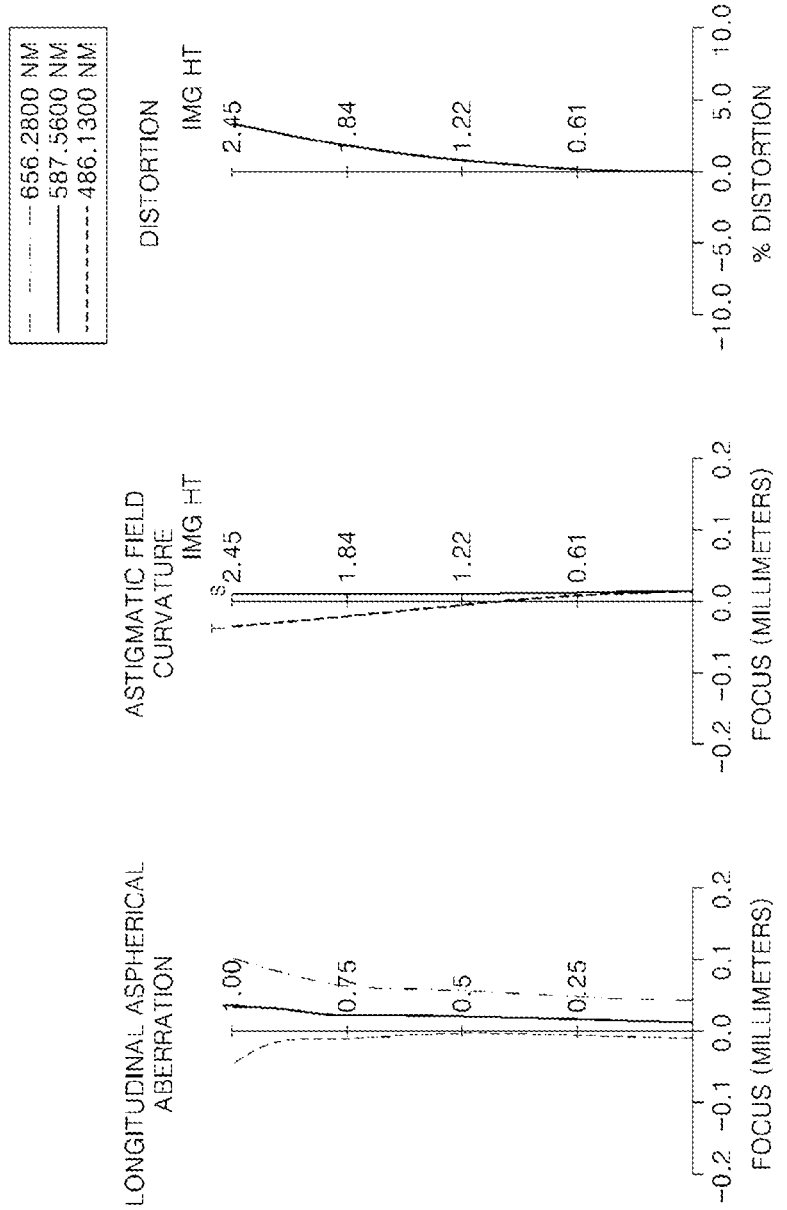

FIGS. 10A through 10C are graphs illustrating aberrations at the wide angle end, the middle end, and the telephoto end of the zoom lens system 1111 of FIG. 9.

<Sixth Exemplary Embodiment>

Figure 11:
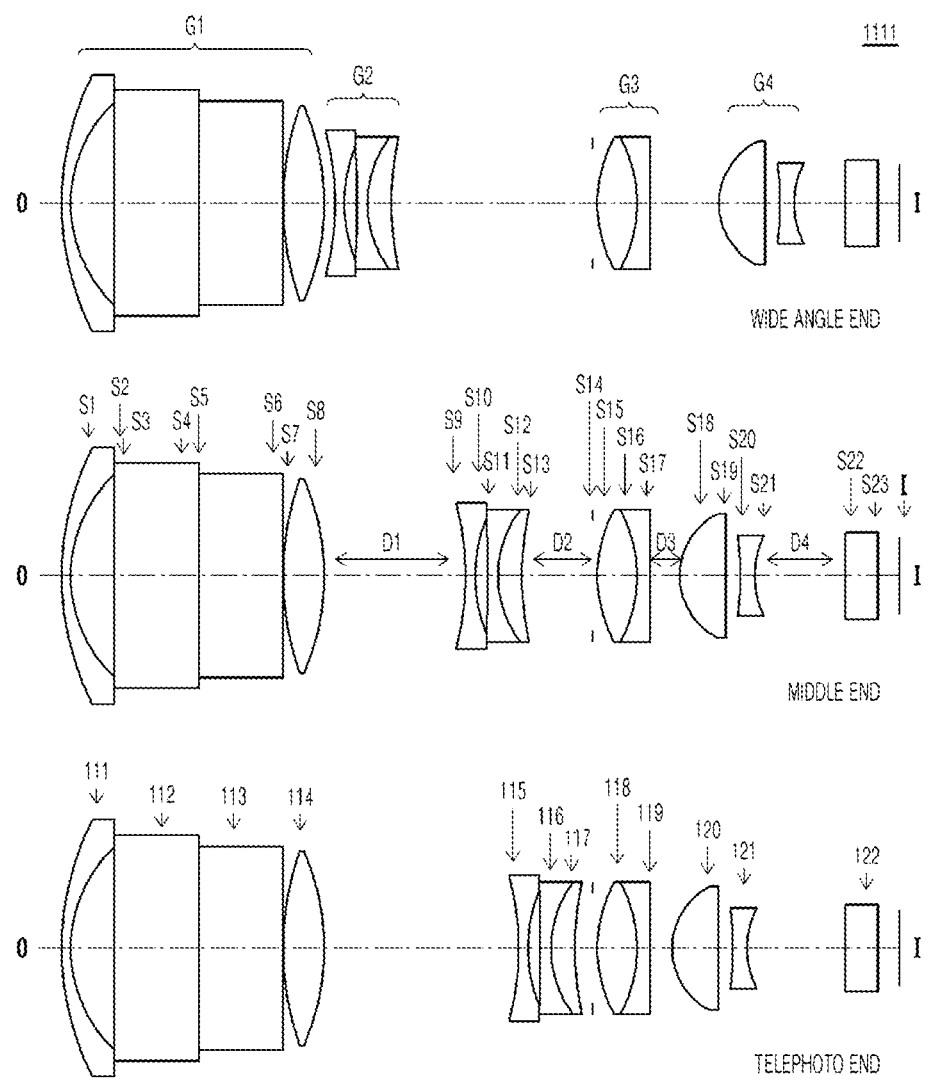
FIG. 11 illustrates a zoom lens system at each of a wide angle end, a middle end, and a telephoto end according to another exemplary embodiment.

FIG. 11 is a diagram of the zoom lens system 1111 at each of a wide angle end, a middle end, and a telephoto end according to another exemplary embodiment.

Table 16 shows design data of the zoom lens system 1111 of FIG. 11.

TABLE 16

| Lens surface | R | Dn | Nd | Vd |
|---|---|---|---|---|
| S1 | 18.1450 | 0.6500 | 1.8467 | 23.7848 |
| S2 | 8.9801 | 2.9078 | | |
| S3 | Infinity | 5.5000 | 1.9229 | 20.8804 |
| S4 | Infinity | 0.0000 | | |
| S5 | Infinity | 5.5000 | 1.9229 | 20.8804 |
| S6 | Infinity | 0.1000 | | |
| S7(ASP) | 21.2377 | 2.6221 | 1.6465 | 58.6331 |
| S8 | −16.0227 | D1 | | |
| S9 | −19.3759 | 0.6500 | 1.8830 | 40.8054 |
| S10 | 10.9427 | 0.8608 | | |
| S11 | −66.5819 | 0.6500 | 1.6180 | 63.3959 |
| S12 | 7.0727 | 1.5623 | 1.9229 | 20.8804 |
| S13 | 21.5794 | D2 | | |
| S14(ST) | Infinity | 0.3500 | | |
| S15 | 8.7878 | 2.6775 | 1.6465 | 47.2777 |
| S16 | −8.2350 | 0.8000 | 1.9037 | 31.3150 |
| S17 | −778.8869 | D3 | | |
| S18 | 4.4946 | 3.0677 | 1.6152 | 63.5041 |
| S19 | −72.2204 | 0.8777 | | |
| S20(ASP) | −45.2213 | 0.9468 | 1.8170 | 24.2000 |
| S21(ASP) | 7.9930 | D4 | | |
| S22 | infinity | 2.1200 | 1.5168 | 64.1983 |
| S23 | infinity | 1.4195 | | |
| S24 | IMG | | | |

Table 17 shows aspherical coefficients of the zoom lens system 1111 of FIG. 11, and Table 18 shows a focal length (EFL), an F-number (Fno), an entire viewing angle (2ω), and variable lengths (D1, D2, D3 and D4) at each of the wide angle end, the middle end, and the telephoto end of the zoom lens system 1111 of FIG. 11.

TABLE 17

| | K | A | B | C | D |
|---|---|---|---|---|---|
| S7 | −1.2080 | −1.7649e−005 | −1.9219e−007 | 4.4435e−009 | −4.2123e−011 |
| S20 | 10.0000 | −2.7869e−003 | 1.6765e−004 | −9.2097e−006 | −2.0809e−007 |
| S21 | 1.9975 | 1.1442e−003 | 3.4641e−004 | 2.7654e−005 | −6.6340e−007 |

TABLE 18

| Variable length | Wide angle end | Middle end | Telephoto end |
|---|---|---|---|
| EFL | 3.8000 | 11.4000 | 19.000 |
| Fno | 1.8000 | 2.5337 | 2.8882 |
| 2ω | 66.0952 | 22.2346 | 13.4948 |
| D1 | 0.6500 | 9.2008 | 12.6780 |
| D2 | 13.1280 | 1.5771 | 1.1000 |
| D3 | 4.5474 | 1.9597 | 1.5000 |
| D4 | 3.4124 | 6.0000 | 6.4598 |

Figure 12A:
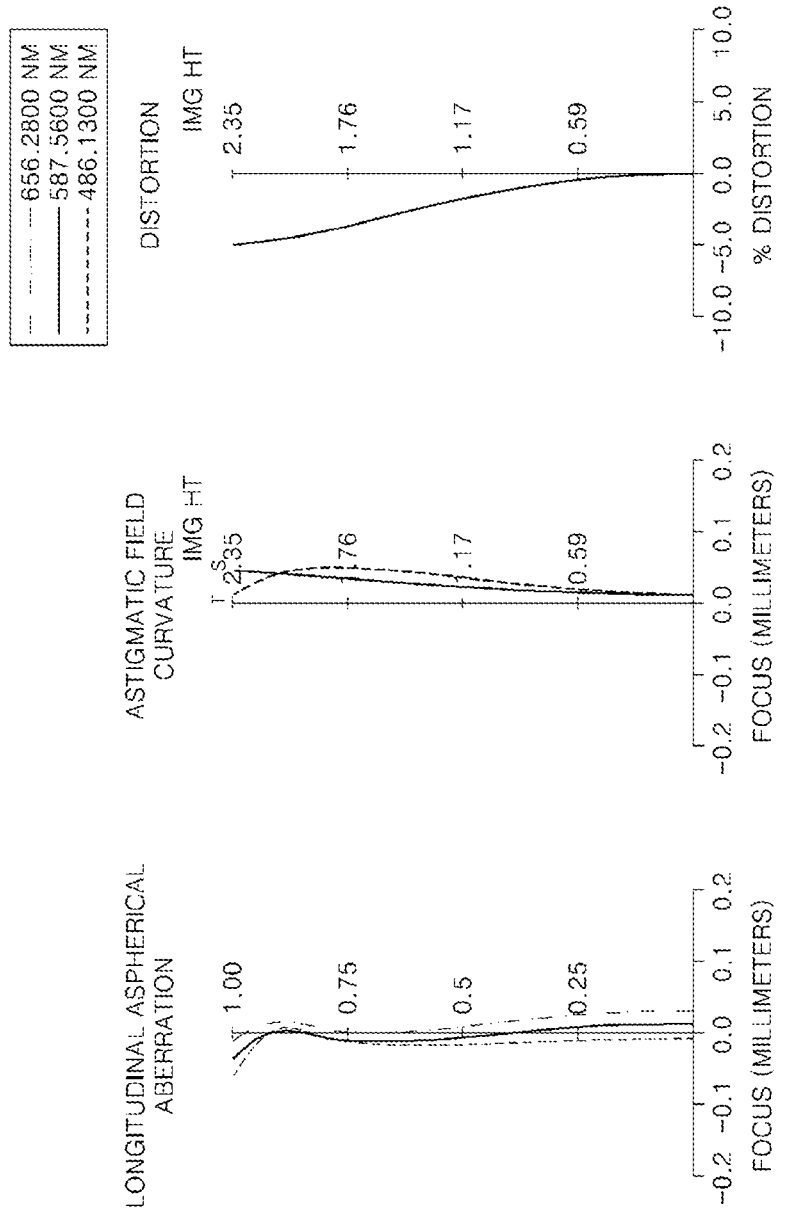
FIGS. 12A through 12C are graphs illustrating aberrations at the wide angle end, the middle end, and the telephoto end of the zoom lens system of FIG. 11, according to an exemplary embodiment.
Figure 12B:
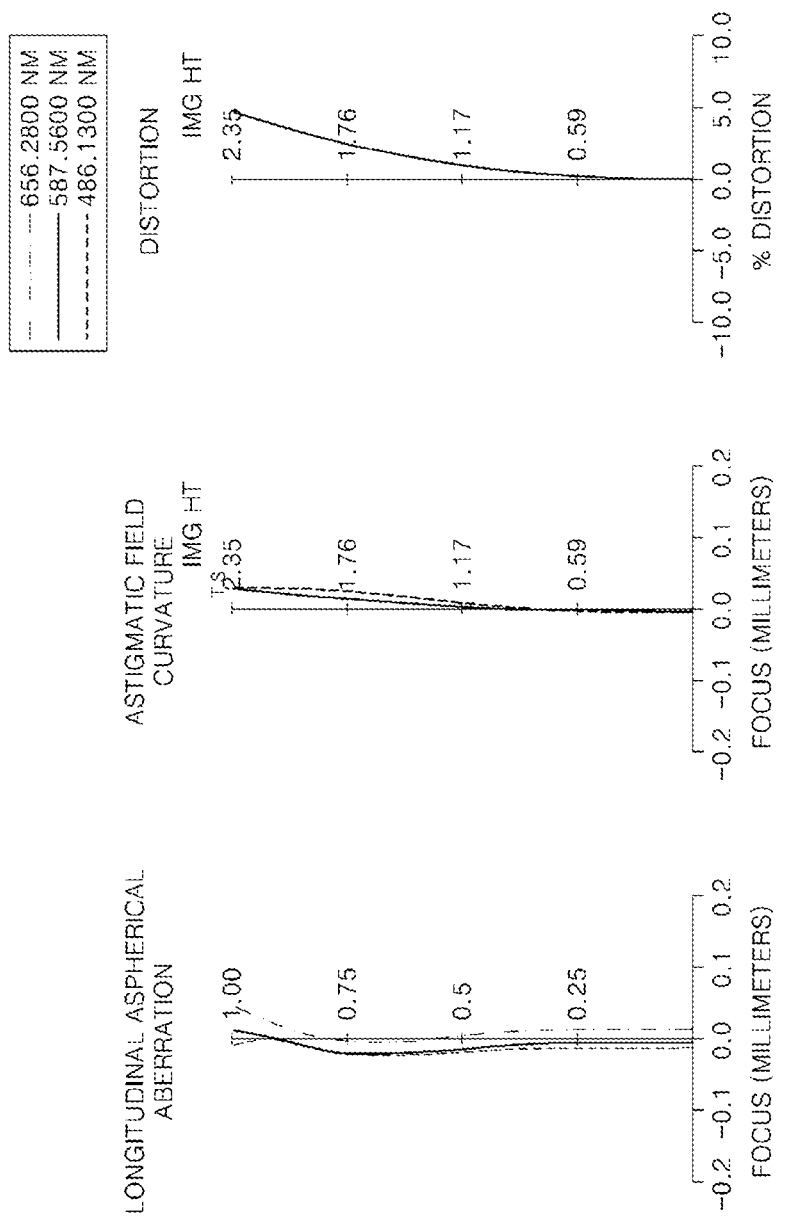
Figure 12C:
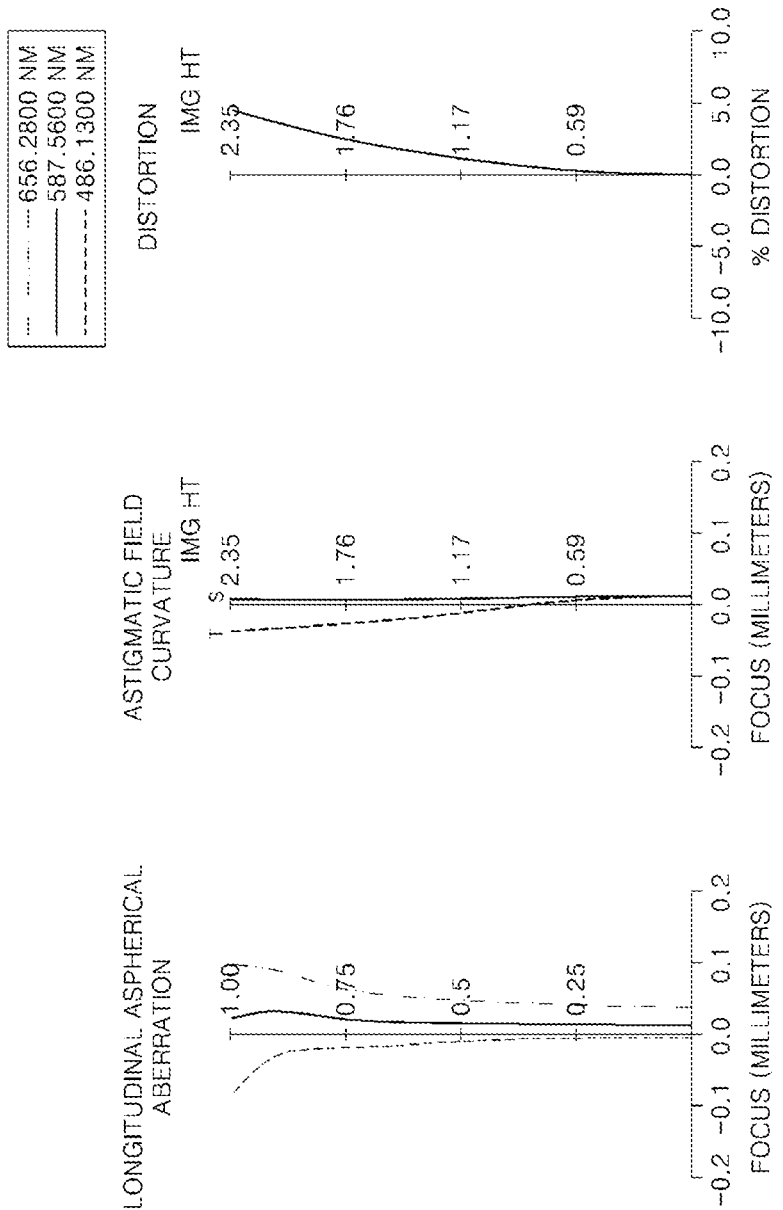

FIGS. 12A through 12C are graphs illustrating aberrations at the wide angle end, the middle end, and the telephoto end of the zoom lens system 1111 of FIG. 11.

<Seventh Exemplary Embodiment>

Figure 13:
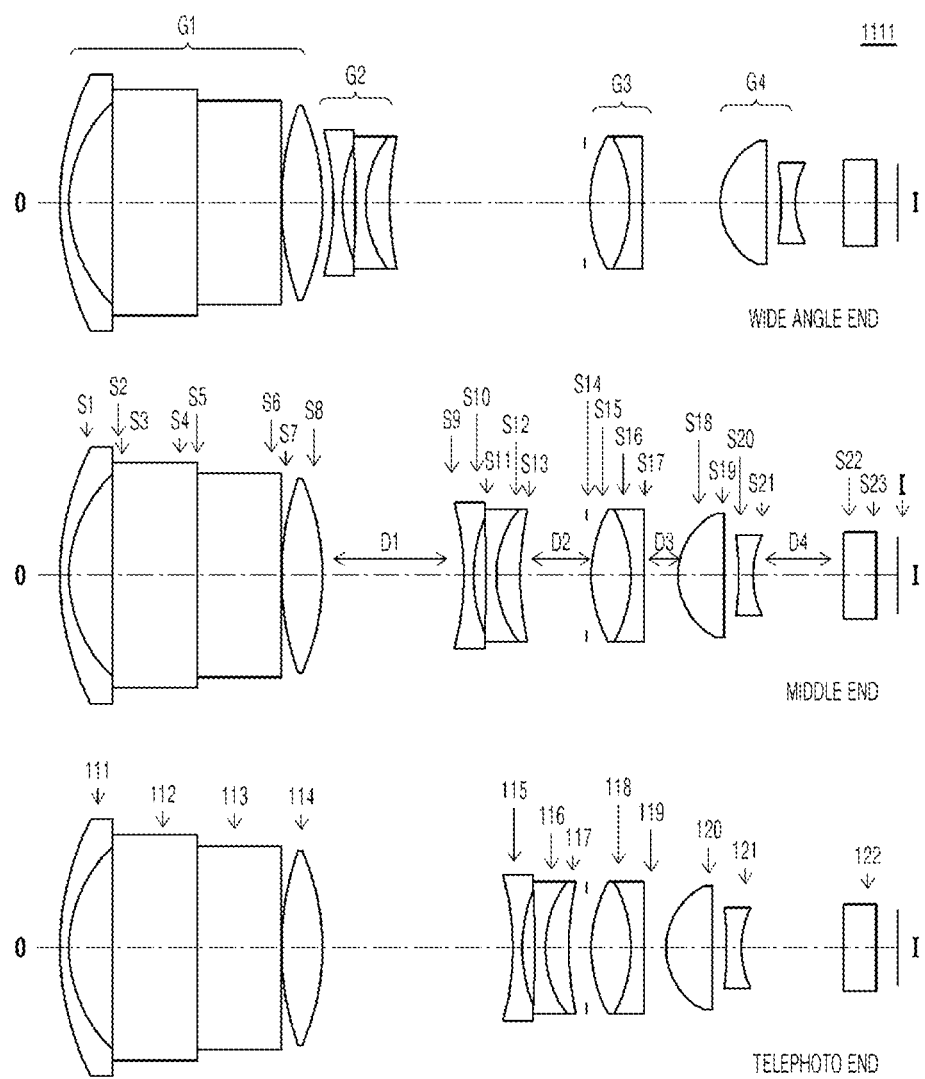
FIG. 13 illustrates a zoom lens system at each of a wide angle end, a middle end, and a telephoto end according to another exemplary embodiment.

FIG. 13 is a diagram of the zoom lens system 1111 at each of a wide angle end, a middle end, and a telephoto end according to another exemplary embodiment.

Table 19 shows design data of the zoom lens system 1111 of FIG. 13.

TABLE 19

| Lens surface | R | Dn | Nd | Vd |
|---|---|---|---|---|
| S1 | 18.9203 | 0.6500 | 1.8467 | 23.7848 |
| S2 | 9.1660 | 2.8267 | | |
| S3 | Infinity | 5.5000 | 1.9229 | 20.8804 |
| S4 | Infinity | 0.0000 | | |
| S5 | Infinity | 5.5000 | 1.9229 | 20.8804 |
| S6 | Infinity | 0.1000 | | |
| S7(ASP) | 19.9057 | 2.6445 | 1.6226 | 58.1640 |
| S8 | −15.8959 | D1 | | |
| S9 | −19.5232 | 0.6500 | 1.8830 | 40.8054 |
| S10 | 11.0072 | 0.8189 | | |
| S11 | −101.3319 | 0.6500 | 1.6180 | 63.3959 |
| S12 | 6.8637 | 1.5465 | 1.9229 | 20.8804 |
| S13 | 18.8729 | D2 | | |
| S14(ST) | Infinity | 0.3500 | | |
| S15 | 8.7188 | 2.6620 | 1.6584 | 50.8546 |
| S16 | −8.2818 | 0.8000 | 1.9108 | 35.2500 |
| S17 | −5629.9446 | D3 | | |
| S18 | 4.2746 | 3.0969 | 1.6063 | 63.7110 |
| S19 | −49.8266 | 0.7960 | | |
| S20 | −12.1926 | 0.8627 | 1.8170 | 24.2000 |
| S21(ASP) | 13.4082 | D4 | | |
| S22 | Infinity | 2.1200 | 1.5168 | 64.1983 |
| S23 | Infinity | 1.6372 | | |
| S24 | IMG | | | |

Table 20 shows aspherical coefficients of the zoom lens system 1111 of FIG. 13, and Table 21 shows a focal length (EFL), an F-number (Fno), an entire viewing angle (2ω), and variable lengths (D1, D2, D3 and D4) at each of the wide angle end, the middle end, and the telephoto end of the zoom lens system 1111 of FIG. 13.

TABLE 20

|  | K | A | B | C | D |
|---|---|---|---|---|---|
| S7 | −1.2290 | −1.8796e−005 | −1.7095e−007 | 1.6655e−009 | −1.4480e−012 |
| S21 | 10.0000 | 4.2222e−003 | 3.1092e−004 | −1.9492e−005 | 9.8502e−006 |

TABLE 21

| Variable length | Wide angle end | Middle end | Telephoto end |
|---|---|---|---|
| EFL | 3.8000 | 11.4000 | 19.000 |
| Fno | 1.8000 | 2.5142 | 2.7181 |
| 2ω | 66.1660 | 22.2694 | 13.5480 |
| D1 | 0.6500 | 9.1709 | 12.4784 |
| D2 | 12.9284 | 4.4075 | 1.1000 |
| D3 | 5.0638 | 2.2871 | 1.5000 |
| D4 | 3.1464 | 5.9231 | 6.7102 |

Figure 14A:
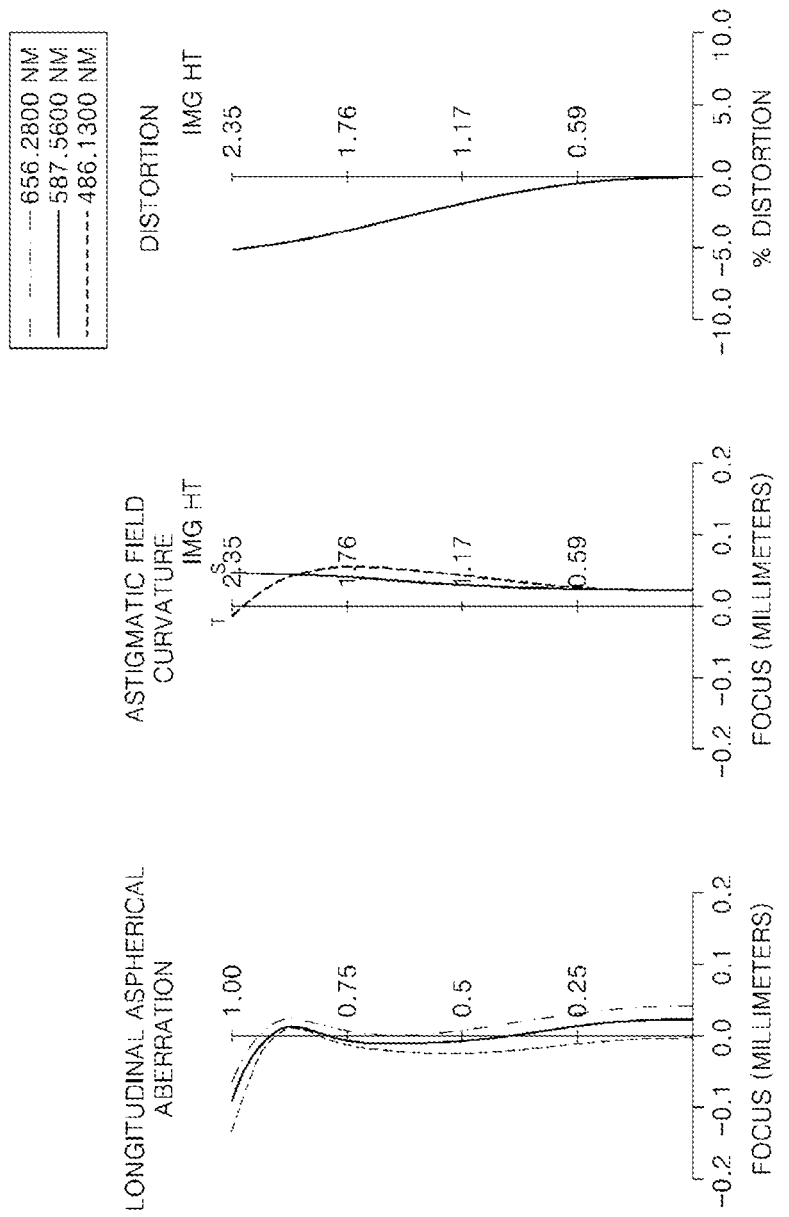
FIGS. 14A through 14C are graphs illustrating aberrations at the wide angle end, the middle end, and the telephoto end of the zoom lens system of FIG. 13, according to an exemplary embodiment.
Figure 14B:
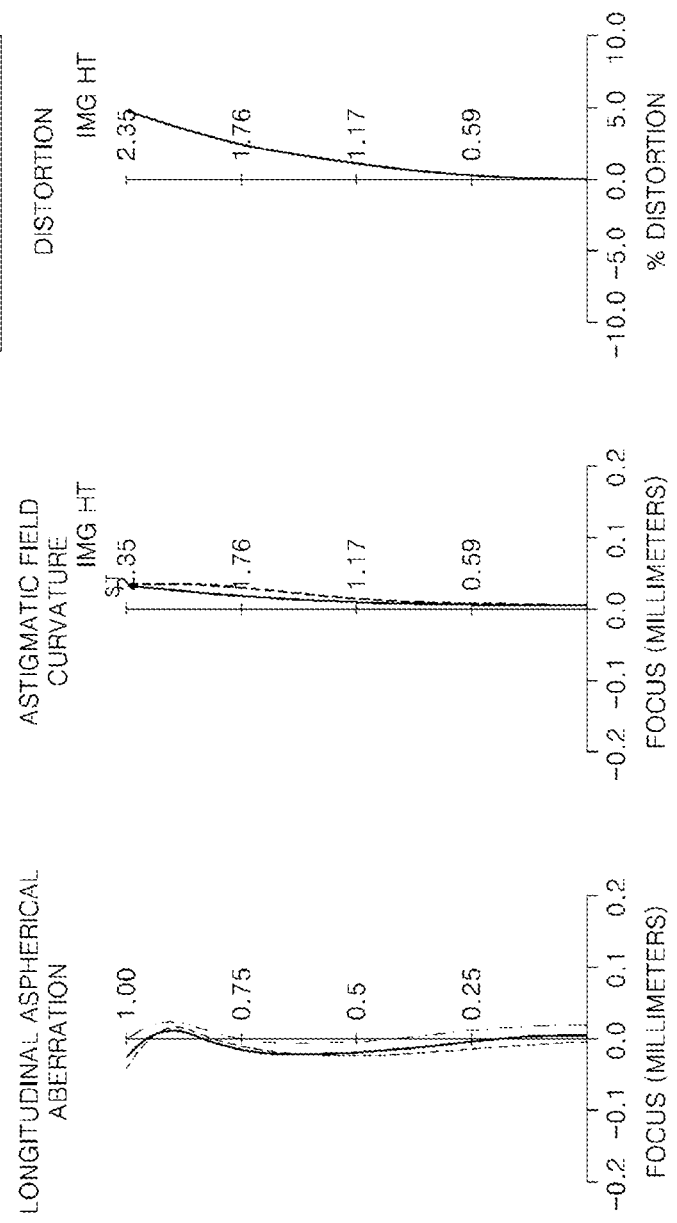
Figure 14C:
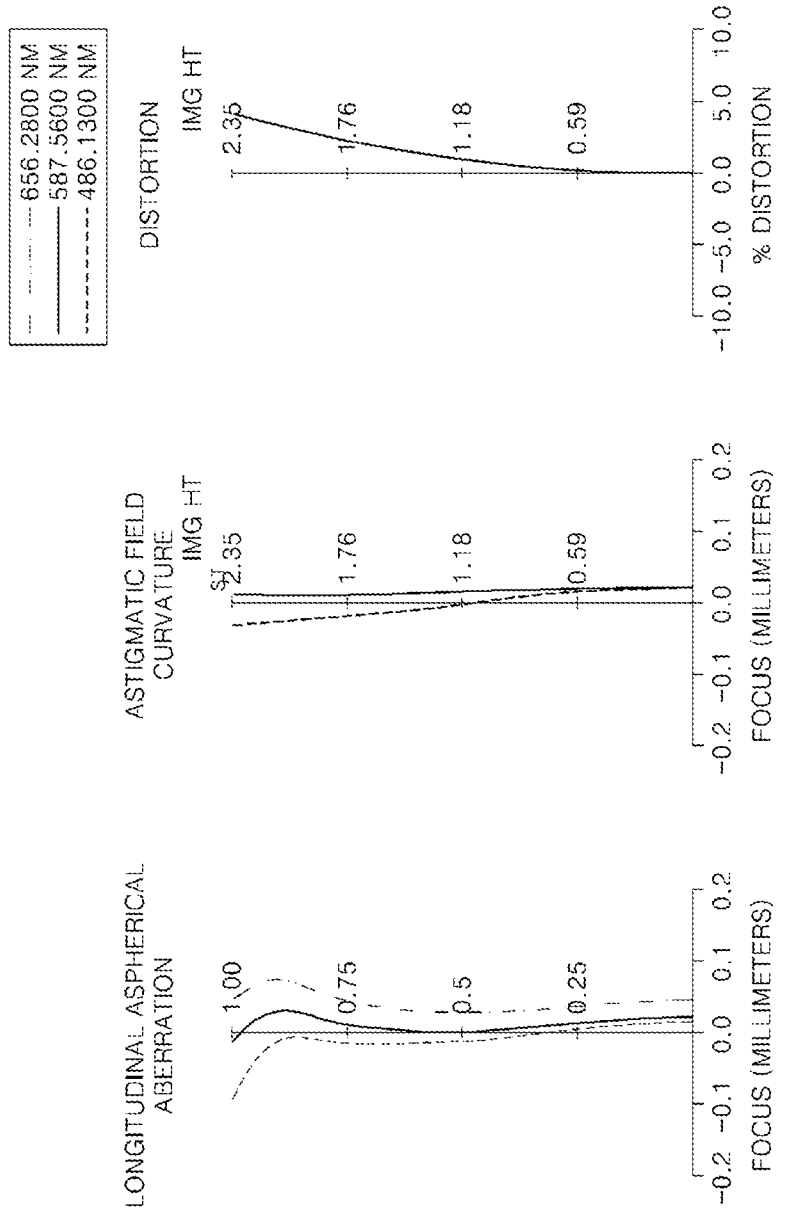

FIGS. 14A through 14C are graphs illustrating aberrations at the wide angle end, the middle end, and the telephoto end of the zoom lens system 1111 of FIG. 13.

<Eighth Exemplary Embodiment>

Figure 15:
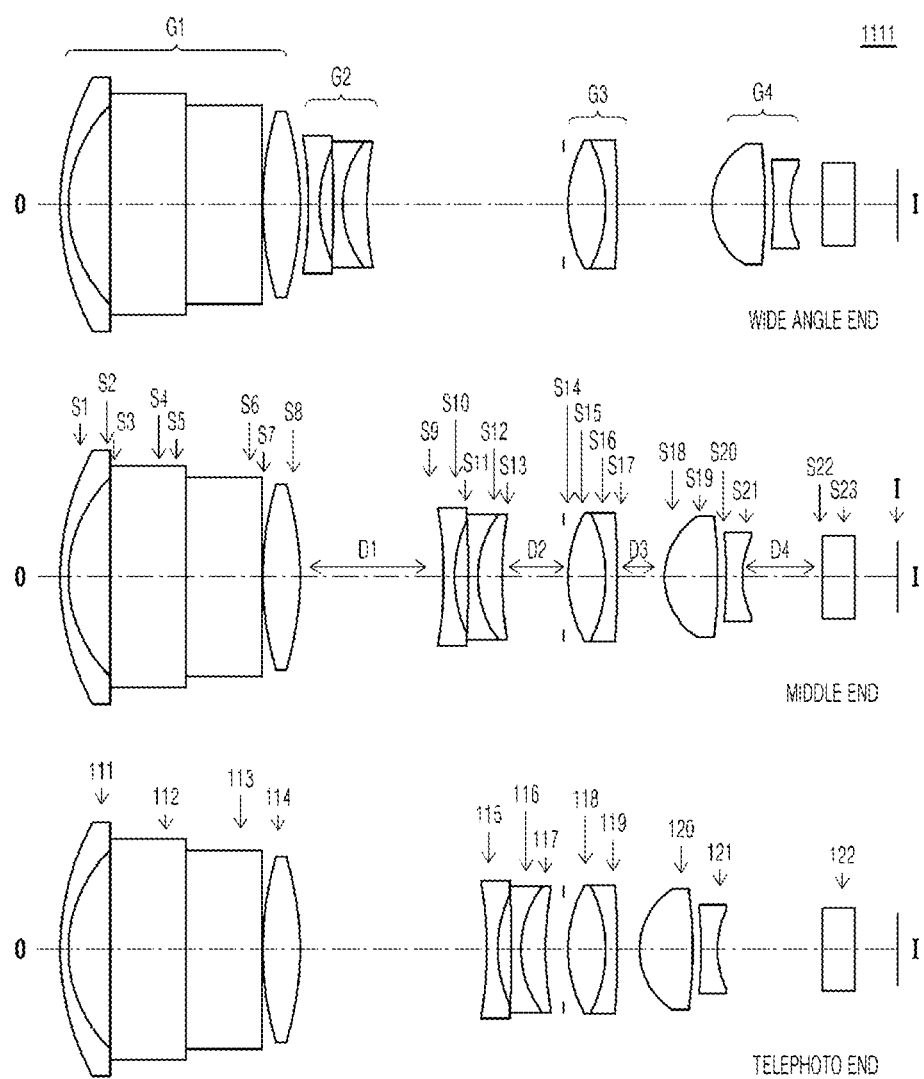
FIG. 15 illustrates a zoom lens system at each of a wide angle end, a middle end, and a telephoto end according to another exemplary embodiment.

FIG. 15 is a diagram of the zoom lens system 1111 at each of a wide angle end, a middle end, and a telephoto end according to another exemplary embodiment.

Table 22 shows design data of the zoom lens system 1111 of FIG. 15.

TABLE 22

| Lens surface | R | Dn | Nd | Vd |
|---|---|---|---|---|
| S1 | 17.4242 | 0.6500 | 1.9229 | 20.8804 |
| S2 | 9.5668 | 2.6733 | | |
| S3 | Infinity | 5.0000 | 1.9229 | 20.8804 |
| S4 | Infinity | 0.0000 | | |
| S5 | Infinity | 5.0000 | 1.9229 | 20.8804 |
| S6 | Infinity | 0.1000 | | |
| S7 | 23.4348 | 2.3264 | 1.7433 | 49.2216 |
| S8 | −21.1687 | D1 | | |
| S9 | −21.7008 | 0.6500 | 1.8830 | 40.8054 |
| S10 | 9.9678 | 0.9061 | | |
| S11 | −65.0492 | 0.6500 | 1.6779 | 55.5187 |
| S12 | 6.8947 | 1.6276 | 1.9229 | 20.8804 |
| S13 | 27.1274 | D2 | | |
| S14(ST) | Infinity | 0.3500 | | |
| S15 | 9.5398 | 2.4661 | 1.6180 | 63.3959 |
| S16 | −8.7436 | 0.7500 | 1.8830 | 40.8054 |
| S17 | −91.3766 | D3 | | |
| S18 | 4.5910 | 0.3500 | 1.6180 | 63.3959 |
| S19 | −34.7262 | 0.6383 | | |
| S20 | −13.6464 | 0.9783 | 1.8170 | 24.2000 |
| S21(ASP) | 14.6454 | D4 | | |
| S22 | Infinity | 2.1200 | 1.5168 | 64.1983 |
| S23 | Infinity | 2.8776 | | |
| S24 | IMG | | | |

Table 23 shows aspherical coefficients of the zoom lens system 1111 of FIG. 15, and Table 24 shows a focal length (EFL), an F-number (Fno), an entire viewing angle (2ω), and variable lengths (D1, D2, D3, and D4) at each of the wide angle end, the middle end, and the telephoto end of the zoom lens system 1111 of FIG. 15:

TABLE 23

|  | K | A | B | C | D |
|---|---|---|---|---|---|
| S21 | −6.1229 | 3.9437e−003 | 2.6557e−004 | −2.2278e−005 | 6.4690e−006 |

TABLE 24

| Variable length | Wide angle end | Middle end | Telephoto end |
|---|---|---|---|
| EFL | 3.8065 | 11.4074 | 19.0113 |
| Fno | 1.8000 | 2.4663 | 2.8083 |
| 2ω | 66.1404 | 22.3094 | 13.5480 |
| D1 | 0.6500 | 9.3999 | 12.3755 |
| D2 | 12.8255 | 4.0756 | 1.1000 |
| D3 | 6.1675 | 3.0389 | 1.5000 |
| D4 | 2.0934 | 5.2220 | 6.7609 |

Figure 16A:
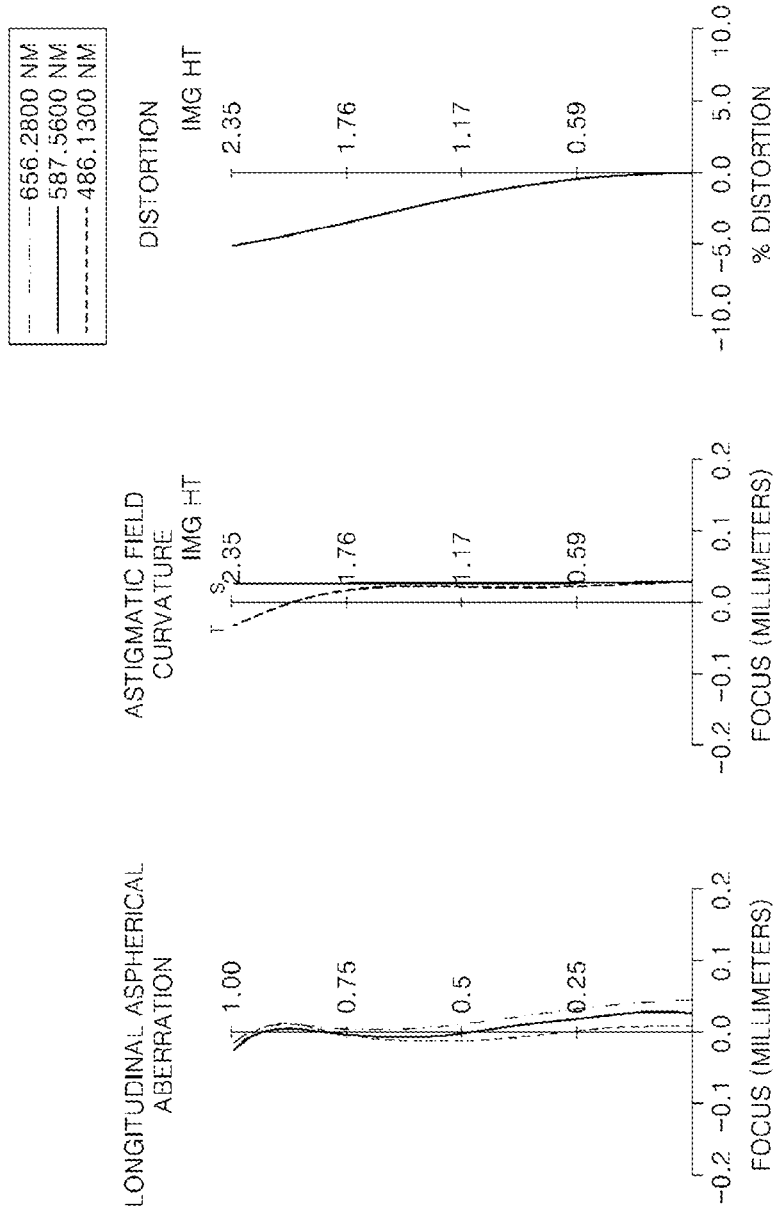
FIGS. 16A through 16C are graphs illustrating aberrations at the wide angle end, the middle end, and the telephoto end of the zoom lens system of FIG. 15, according to an exemplary embodiment.
Figure 16B:
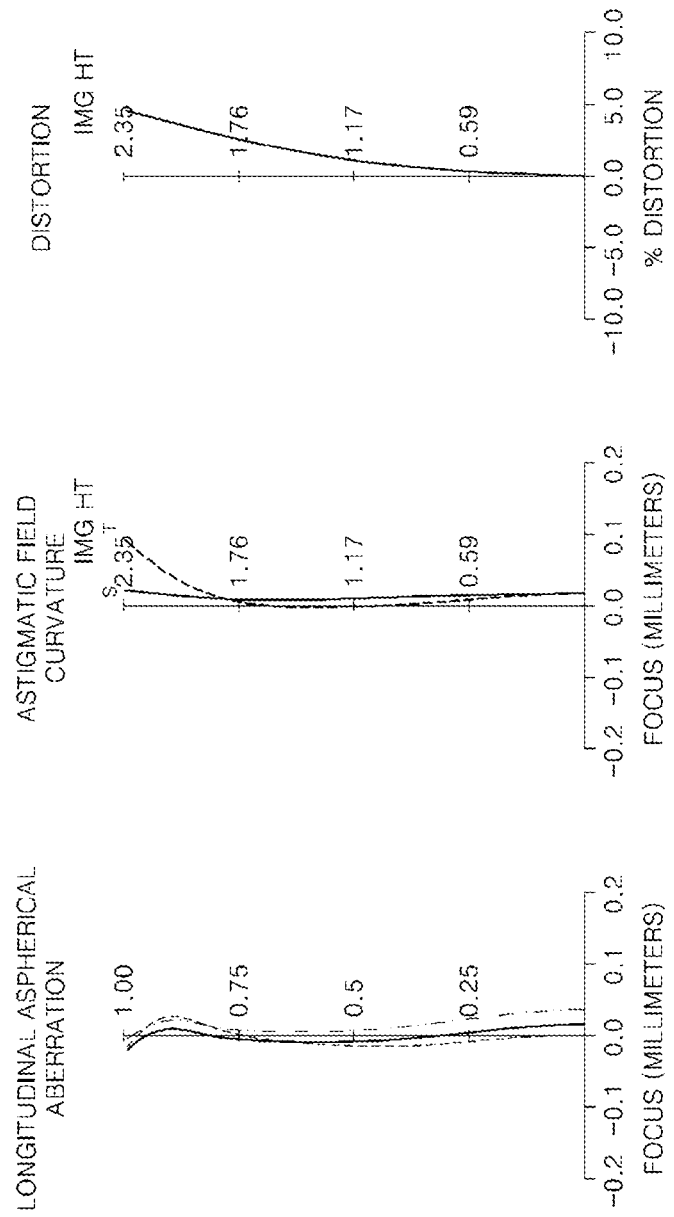
Figure 16C:
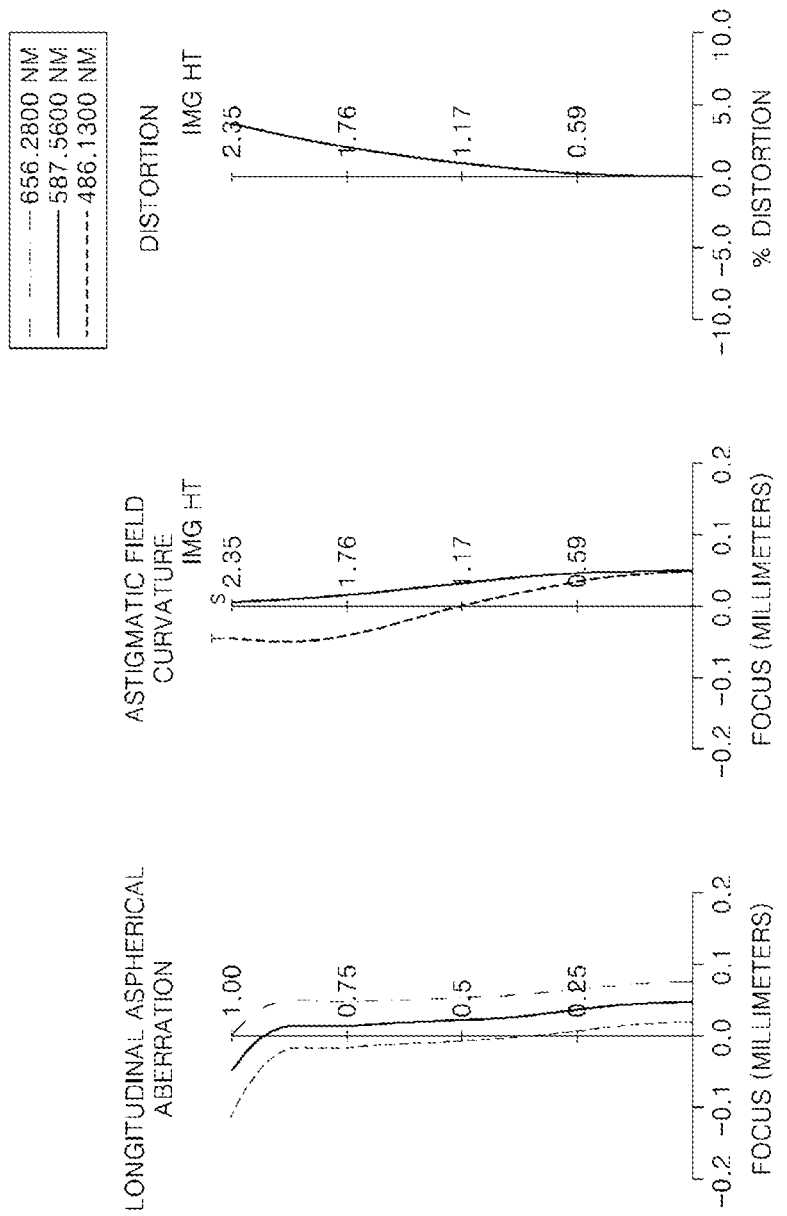

FIGS. 16A through 16C are graphs illustrating aberrations at the wide angle end, the middle end, and the telephoto end of the zoom lens system 1111 of FIG. 15.

Table 25 shows that each of the first through eighth exemplary embodiments satisfies conditions of Expressions 1 and 2.

TABLE 25

|  | First embodiment | Second embodiment | Third embodiment | Fourth embodiment | Fifth embodiMent | Sixth embodiment | Seventh Embodiment | Eighth embodiMent |
|---|---|---|---|---|---|---|---|---|
| Exp. 1 | 2.00492 | 2.35871 | 2.31793 | 2.60651 | 2.53950 | 2.24587 | 2.28026 | 2.54407 |
| Exp. 2 | −0.80037 | −0.86158 | −0.86801 | −0.91875 | −0.96071 | −0.83694 | −0.82863 | −0.82068 |

The zoom lens system according to the exemplary embodiments has a high zooming rate, a small-size, and low costs of manufacturing. The zoom lens system according to the exemplary embodiments may be appropriately used in photographing apparatuses including a digital still camera, a single lens reflex camera, a video camera, a portable terminal, or the like using a solid-state imaging device such as a charge coupled device (CCD) or a complementary metal-oxide semiconductor (CMOS).

Figure 17:
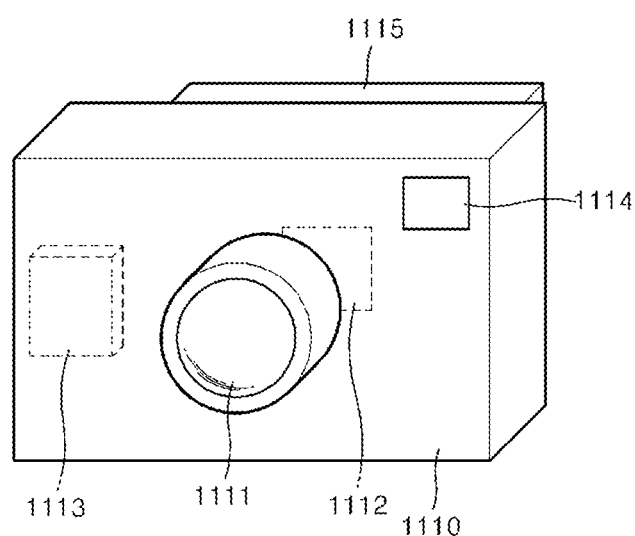
FIG. 17 is a diagram of a photographing apparatus including the zoom lens system, according to an exemplary embodiment.

FIG. 17 is a diagram of a photographing apparatus 1100 including the zoom lens system 1111, according to an embodiment. The photographing apparatus 1100 includes the zoom lens system 1111 according to the above exemplary embodiments, and an imaging sensor 1112 for converting light collected by the zoom lens system 1111 into an electrical image signal. The photographing apparatus 1100 may include a recording means 1113 and a viewfinder 1114 for viewing a target object image, wherein information corresponding to the target object image that is photoelectrically converted by the imaging sensor 1112 is recorded to the recording means 1113. Also, the photographing apparatus 1100 may include a display unit 1115 for displaying the target object image. In the present exemplary embodiment of FIG. 17, the viewfinder 1114 and the display unit 1115 are separately arranged, but the display unit 1115 may be arranged without the viewfinder 1114. The photographing apparatus 1100 of FIG. 17 is an example, and thus, the above exemplary embodiments may be applied to various optical apparatuses other than a camera. As described above, by applying the zoom lens system 1111 to a photographing apparatus such as a digital camera, it is possible to provide an optical device having a small-size, a low cost, and a high zooming rate.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. A zoom lens system comprising:
a first lens group comprising one or more lenses, and an optical member for changing a path of light, and having a positive refractive power;
a second lens group having a negative refractive power;
a third lens group having a positive refractive power; and
a fourth lens group having a positive refractive power,
wherein the first lens group, the second lens group, the third lens group, and the fourth lens group are sequentially arranged from an object side to an image side,
wherein zooming is performed by varying air gaps between the first through fourth lens groups, and
wherein the zoom lens system satisfies the following expressions:

$$1.8 \le \frac{f_I}{\sqrt{f_W f_T}} \le 2.7,$$

and $$-1.0 \le \frac{f_{II}}{\sqrt{f_W f_T}} \le -0.7,$$

where $f_W$ indicates an overall focal length at a wide angle end, $f_T$ indicates an overall focal length at a telephoto end, $f_I$ indicates a focal length of the first lens group, and $f_{II}$ indicates a focal length of the second lens group, wherein the fourth lens group performs focusing, and wherein an F-number at the wide angle end is equal to or less than 1.8.

2. The zoom lens system of claim 1, wherein the third lens group comprises an aperture.

3. The zoom lens system of claim 2, wherein the aperture is disposed at the object side of the third lens group.

4. The zoom lens system of claim 1, wherein the optical member satisfies the following expression:

$$n_{I(P)} \ge 1.80$$

where $n_{I(P)}$ indicates a refractive index of the optical member.

5. The zoom lens system of claim 4, wherein the optical member comprises a prism.

6. The zoom lens system of claim 1, wherein the first lens group comprises a negative lens, the optical member for changing a path of light that has passed through the negative lens, and a positive lens.

7. The zoom lens system of claim 6, wherein the negative lens is a meniscus lens having a convex surface toward the object side.

8. The zoom lens system of claim 1, wherein the fourth lens group comprises a positive lens and a negative lens.

9. The zoom lens system of claim 1, wherein the third lens group comprises a positive lens, a positive lens, and a negative lens.

10. The zoom lens system of claim 1, wherein the third lens group comprises two or more lenses.

11. The zoom lens system of claim 1, wherein at least one of the first through fourth lens groups comprises at least one aspherical lens.

12. The zoom lens system of claim 1, wherein at least one of the second through fourth lens groups comprises at least one doublet lens.

13. The zoom lens system of claim 1, wherein the second lens group and the fourth lens group move during zooming.

14. A photographing apparatus comprising:
a zoom lens system; and
an imaging sensor for converting an image formed by the zoom lens system into an electrical signal,
wherein the zoom lens system comprises:
a first lens group comprising one or more lenses, and an optical member for changing a path of light, and having a positive refractive power;
a second lens group having a negative refractive power;
a third lens group having a positive refractive power; and
a fourth lens group having a positive refractive power,
wherein the first lens group, the second lens group, the third lens group, and the fourth lens group are sequentially arranged from an object side to an image side,
wherein zooming is performed by varying air gaps between the first through fourth lens groups, and
wherein the zoom lens system satisfies the following expressions:

$$1.8 \le \frac{f_I}{\sqrt{f_W f_T}} \le 2.7,$$

and $$-1.0 \le \frac{f_{II}}{\sqrt{f_W f_T}} \le -0.7,$$

where $f_W$ indicates an overall focal length at a wide angle end, $f_T$ indicates an overall focal length at a telephoto end, $f_I$ indicates a focal length of the first lens group, and $f_{II}$ indicates a focal length of the second lens group, wherein the fourth lens group performs focusing, and
wherein an F-number at the wide angle end is equal to or less than 1.8.

15. The photographing apparatus of claim 14, wherein the third lens group comprises an aperture.

16. The photographing apparatus of claim 15, wherein the aperture is disposed at the object side of the third lens group.

17. The photographing apparatus of claim 14, wherein the optical member satisfies the following expression:

$$n_{I(P)} \geq 1.80$$

where $n_{I(P)}$ indicates a refractive index of the optical member.

18. The photographing apparatus of claim 14, wherein the first lens group comprises a negative lens, the optical member for changing a path of light that has passed through the negative lens, and a positive lens.

* * * * *